Oct. 10, 1944. W. S. REYNOLDS 2,359,939
TRIMMING MACHINE
Filed June 3, 1941 14 Sheets-Sheet 1

INVENTOR
WARREN S. REYNOLDS
BY
ATTORNEY

INVENTOR
WARREN S. REYNOLDS
BY
ATTORNEY

Oct. 10, 1944.    W. S. REYNOLDS    2,359,939
TRIMMING MACHINE
Filed June 3, 1941    14 Sheets-Sheet 4
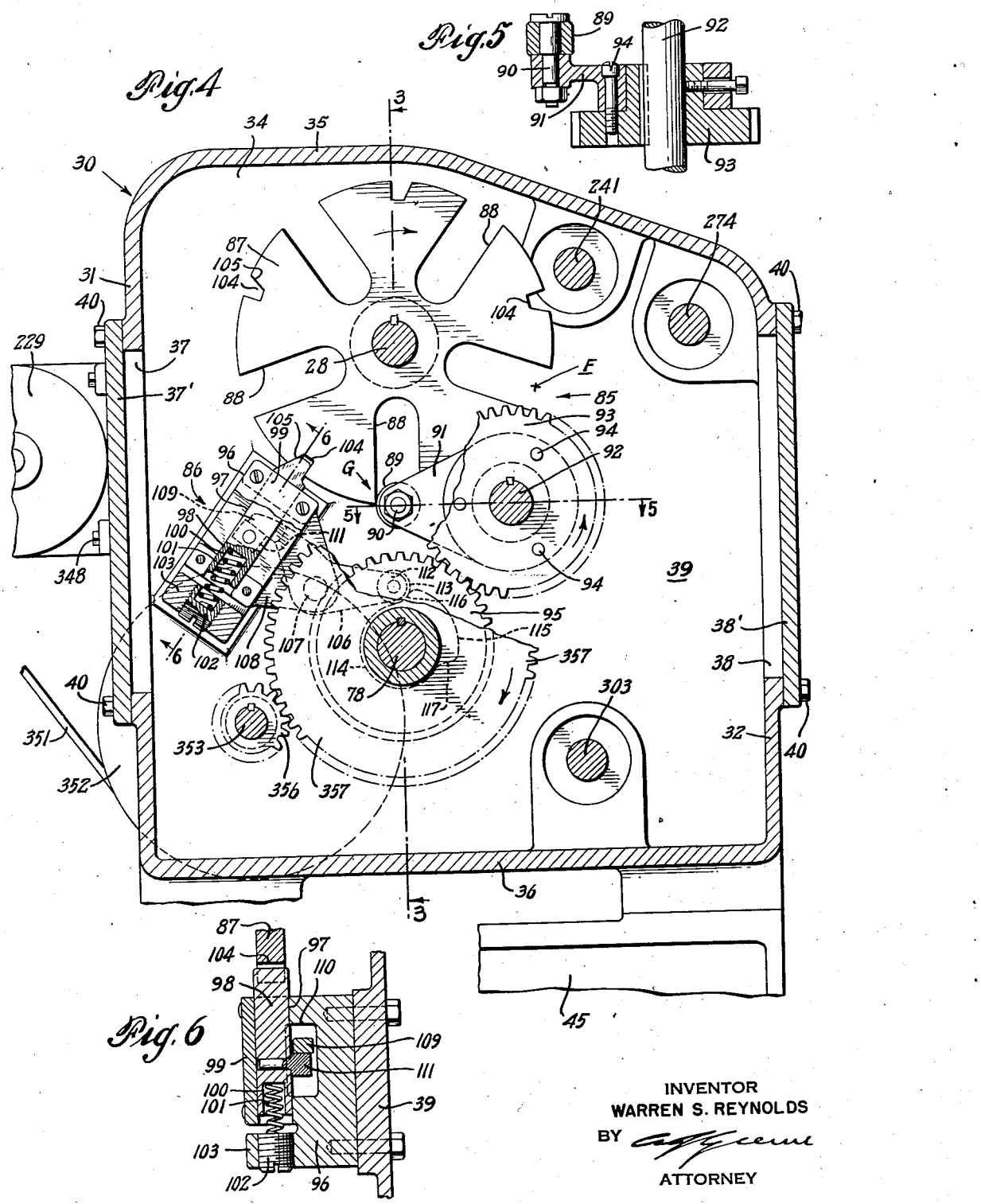
INVENTOR
WARREN S. REYNOLDS
BY
ATTORNEY Oct. 10, 1944.   W. S. REYNOLDS   2,359,939
TRIMMING MACHINE
Filed June 3, 1941   14 Sheets-Sheet 7
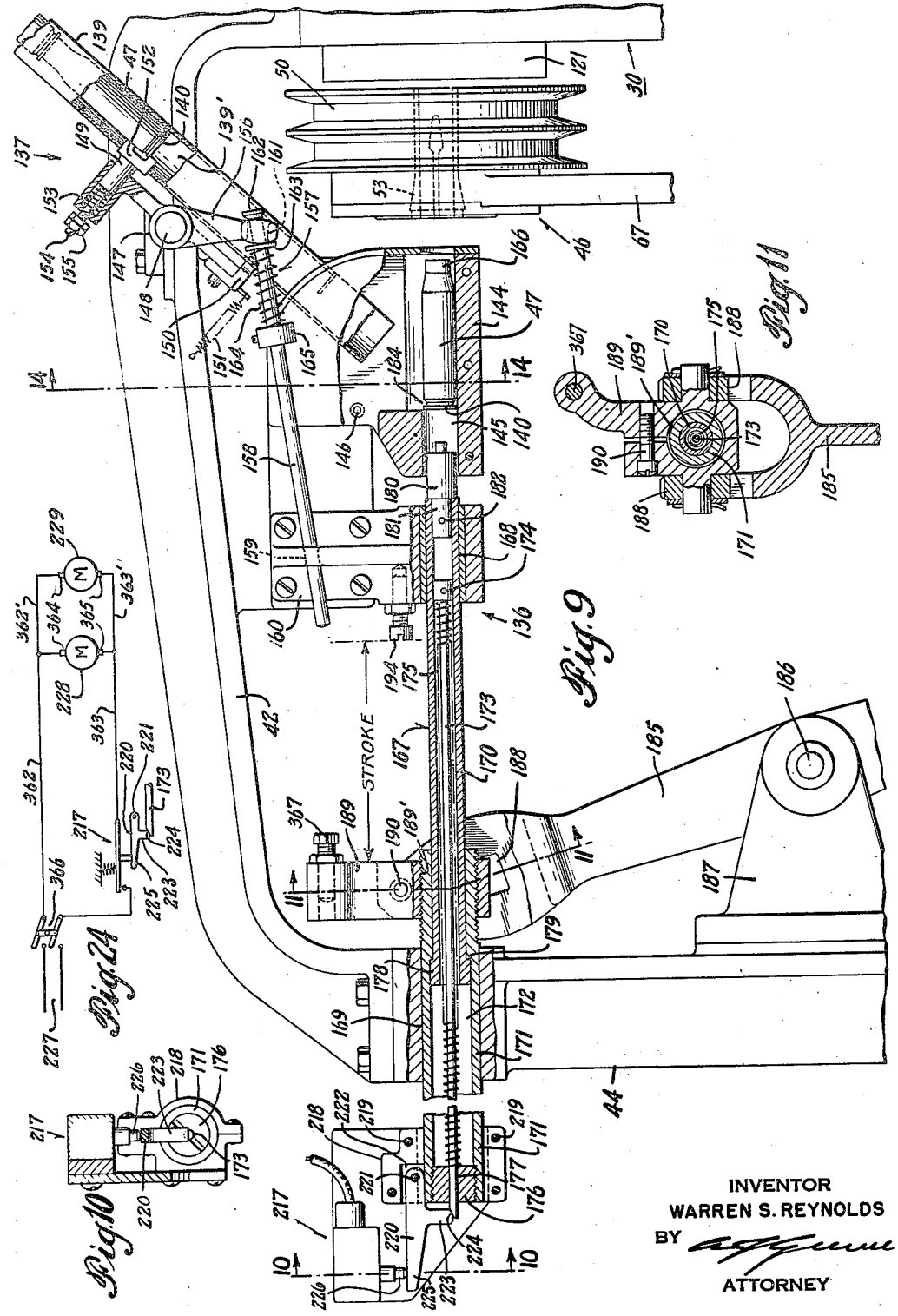
INVENTOR
WARREN S. REYNOLDS
BY 
ATTORNEY

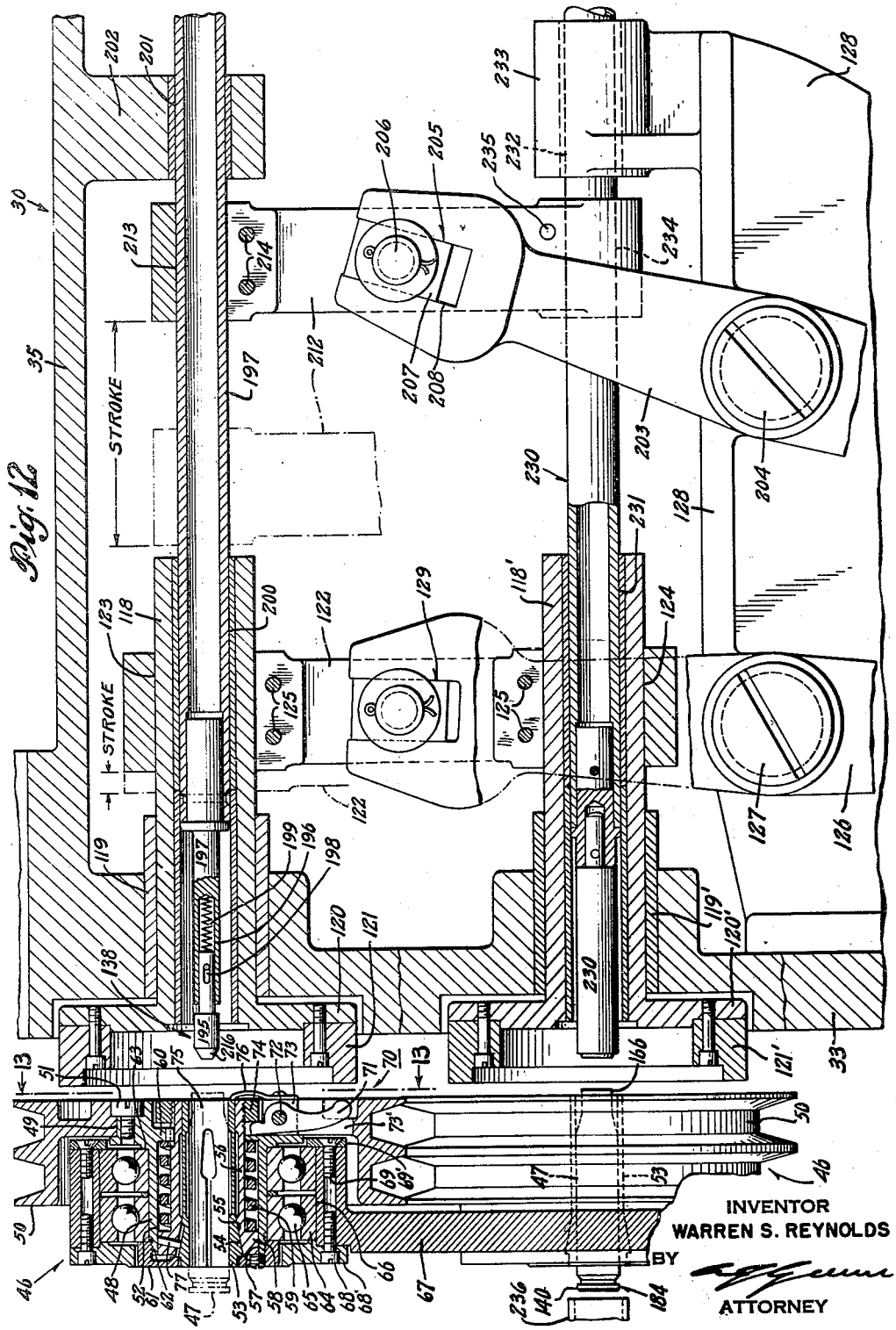

Oct. 10, 1944.   W. S. REYNOLDS   2,359,939
TRIMMING MACHINE
Filed June 3, 1941   14 Sheets-Sheet 9
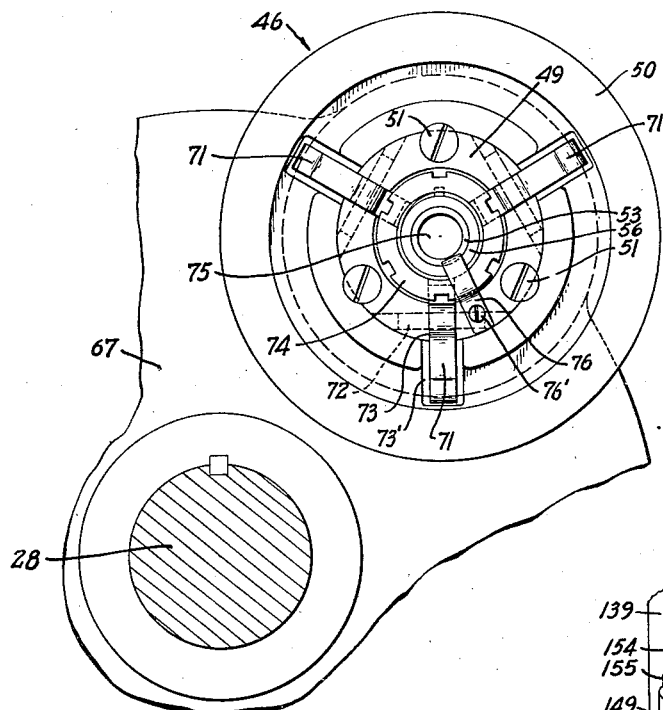
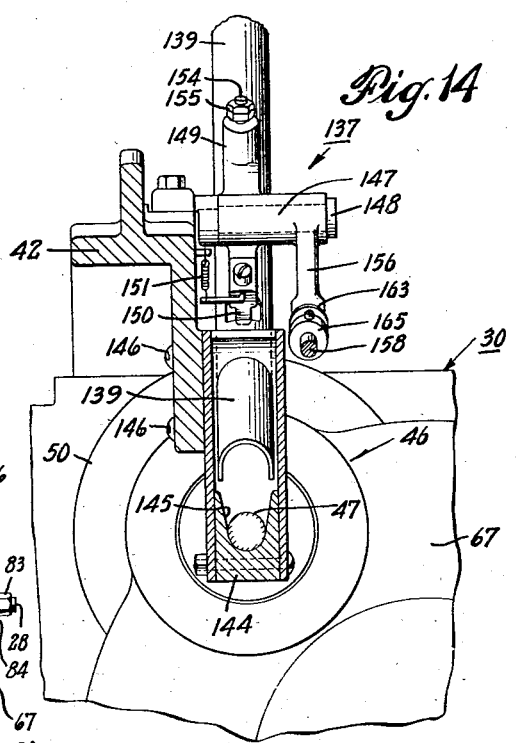
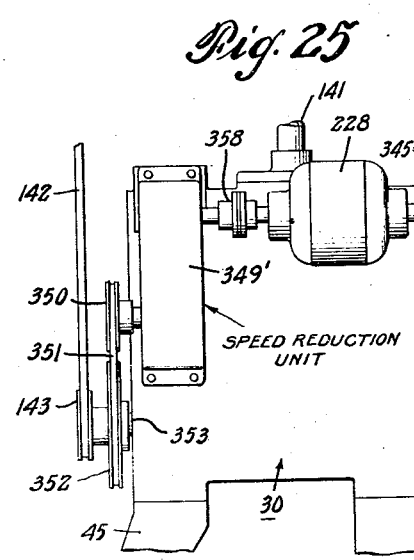
INVENTOR
WARREN S. REYNOLDS
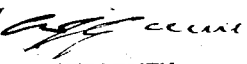
ATTORNEY Oct. 10, 1944.  W. S. REYNOLDS  2,359,939
TRIMMING MACHINE
Filed June 3, 1941  14 Sheets-Sheet 10
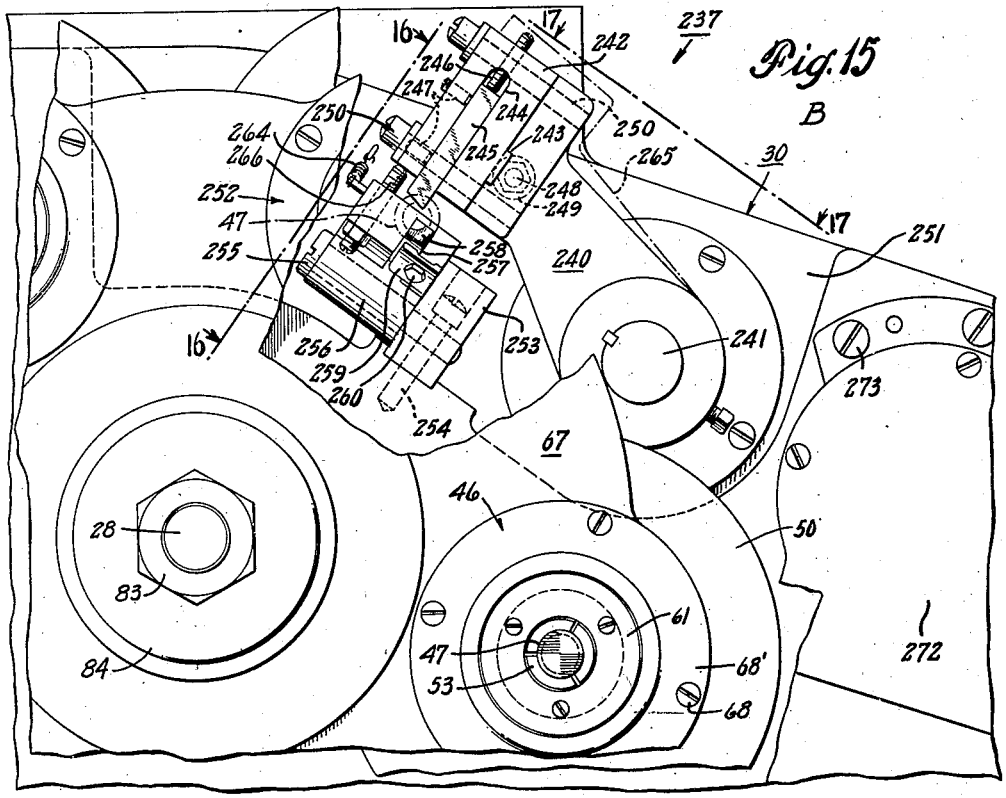
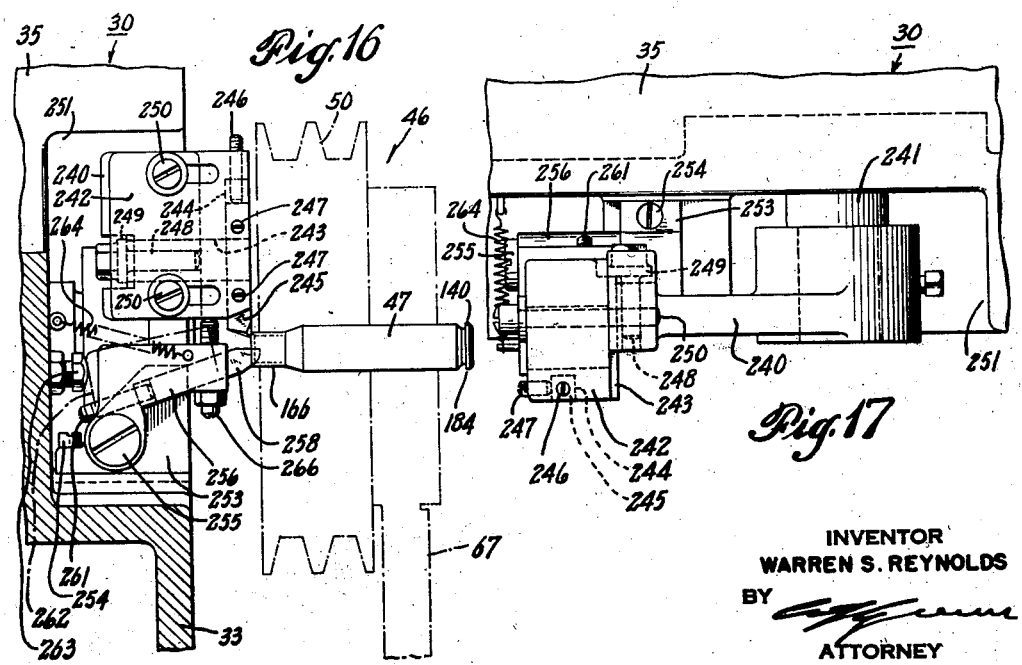
INVENTOR
WARREN S. REYNOLDS
BY
ATTORNEY Oct. 10, 1944.  W. S. REYNOLDS  2,359,939
TRIMMING MACHINE
Filed June 3, 1941  14 Sheets-Sheet 11
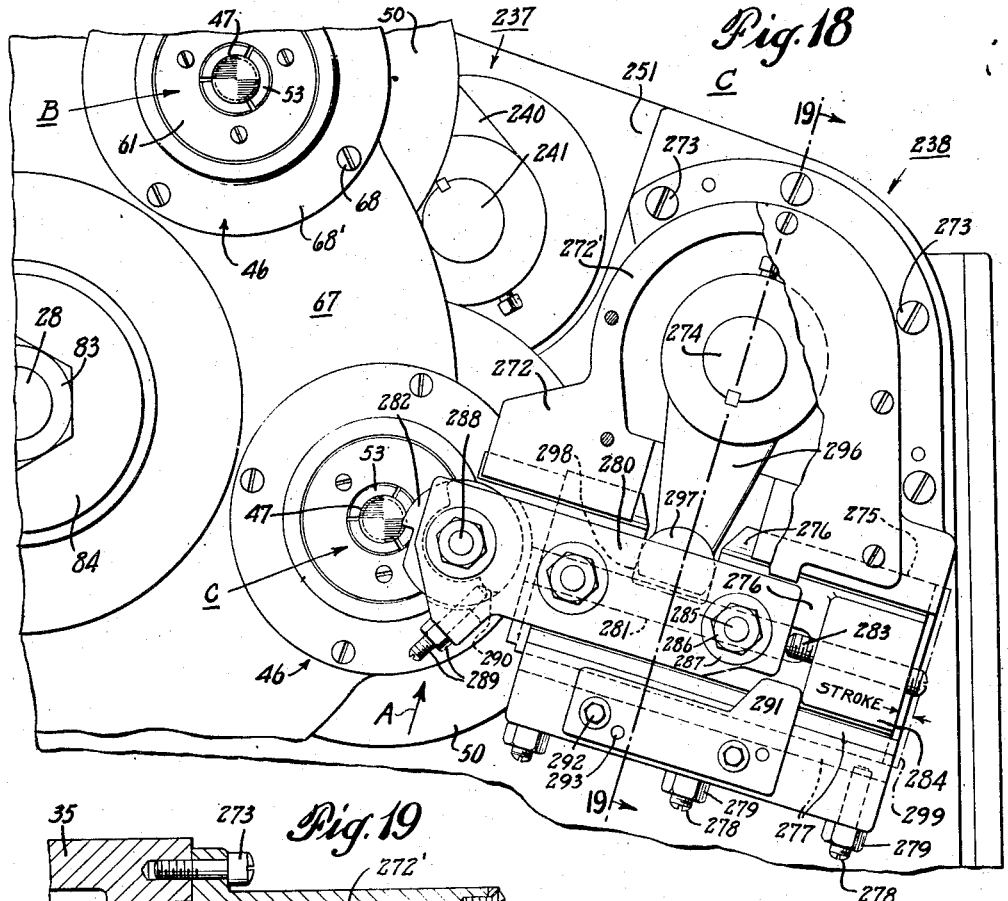
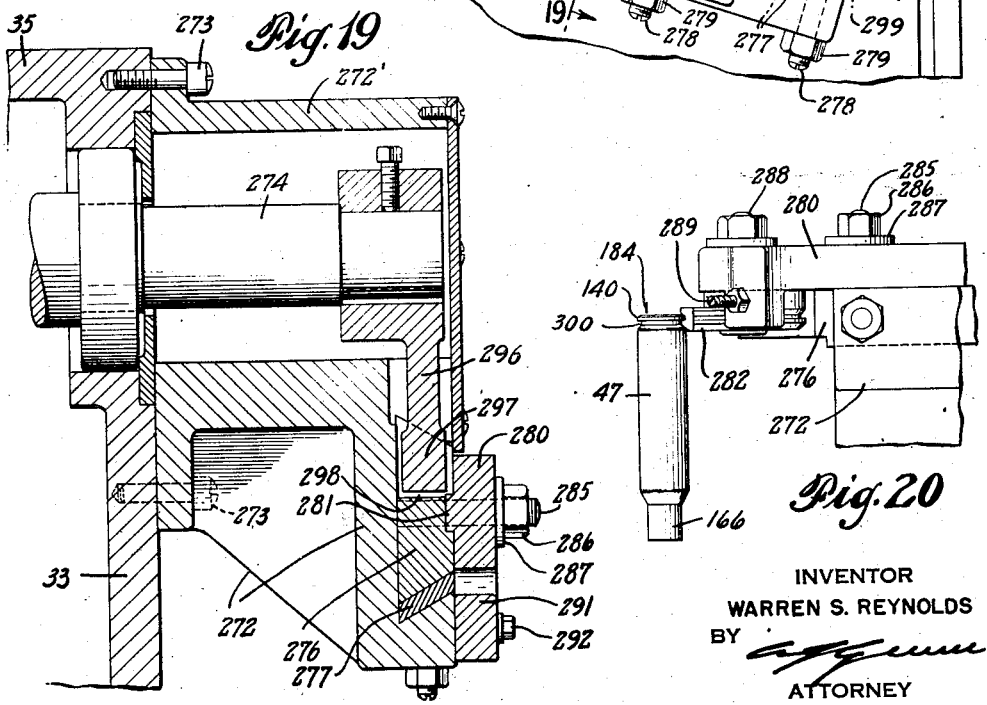
INVENTOR
WARREN S. REYNOLDS
BY
ATTORNEY Oct. 10, 1944.    W. S. REYNOLDS    2,359,939
TRIMMING MACHINE
Filed June 3, 1941    14 Sheets-Sheet 13
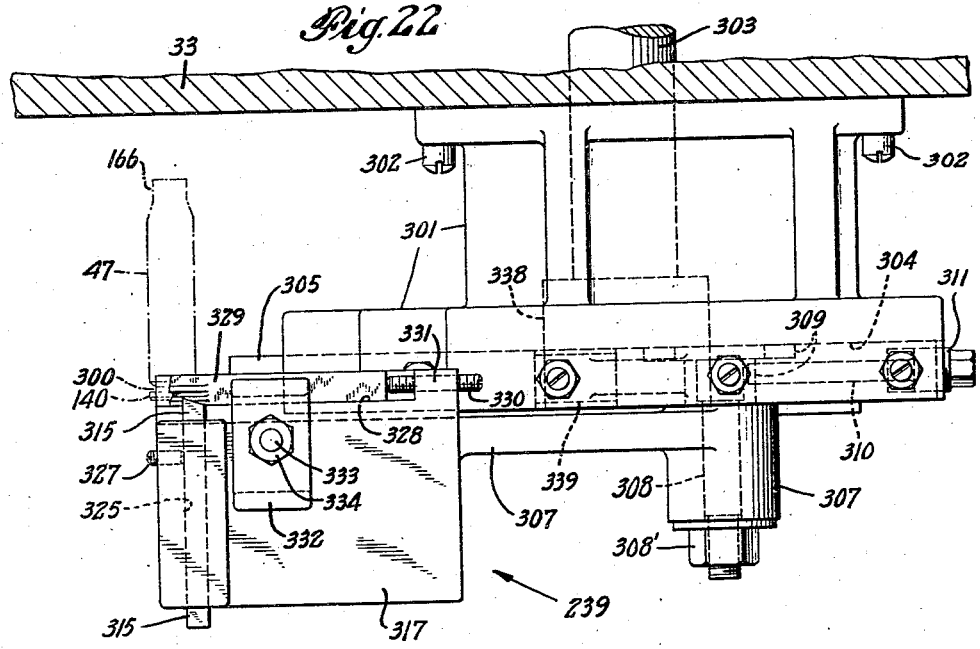
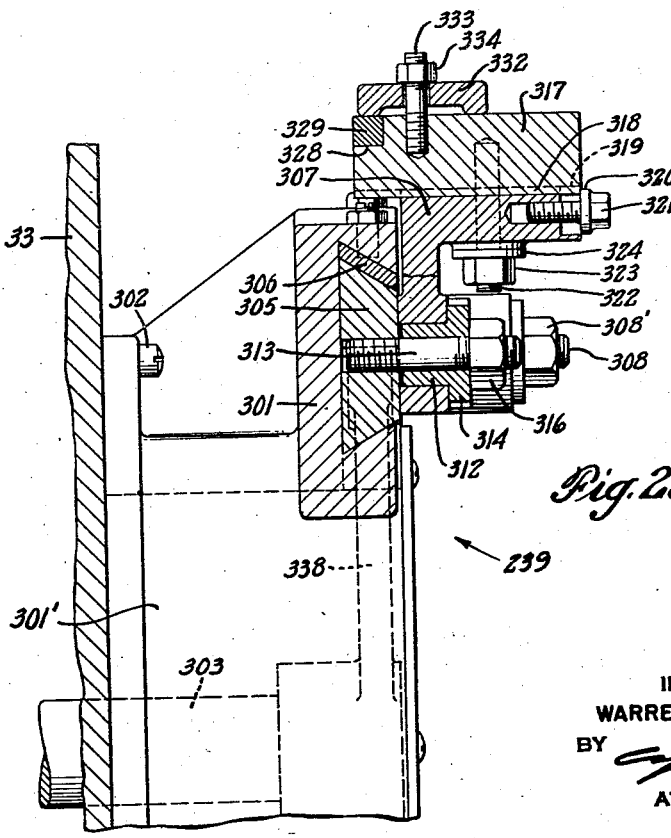
INVENTOR
WARREN S. REYNOLDS
BY 
ATTORNEY Oct. 10, 1944.    W. S. REYNOLDS    2,359,939
TRIMMING MACHINE
Filed June 3, 1941    14 Sheets-Sheet 14
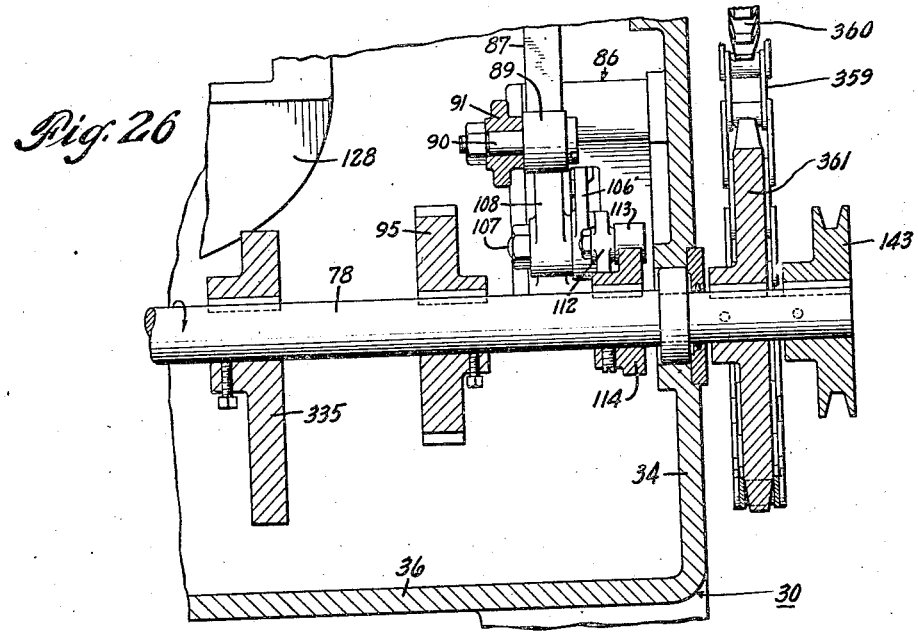
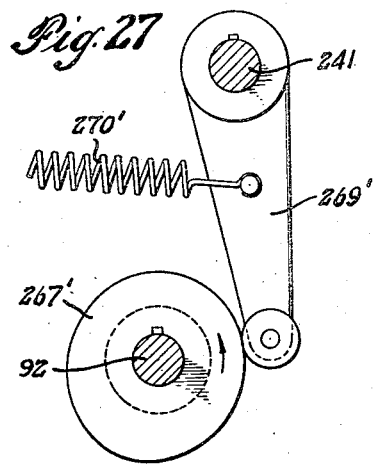
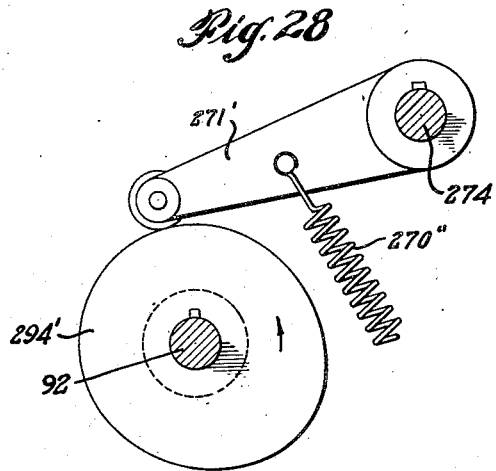
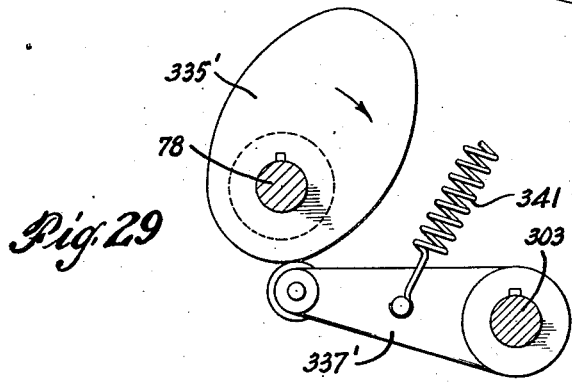
INVENTOR
WARREN S. REYNOLDS
BY
ATTORNEY Patented Oct. 10, 1944

2,359,939

UNITED STATES PATENT OFFICE 2,359,939

TRIMMING MACHINE

Warren S. Reynolds, Stratford, Conn., assignor to Remington Arms Company, Inc., a corporation of Delaware Application June 3, 1941, Serial No. 396,406

16 Claims. (Cl. 29—38)

This invention relates to automatic machines, of the metal-working variety. While it is herein shown as performing what may be generally termed turning operations, it is applicable to cutting-off and divers other operations. In the embodiment herein specifically disclosed for illustrative purposes, it is particularly for finishing both ends of ammunition components such as cartridge blanks.

Although many metal-turning machines have been proposed heretofore most of these have been capable of operating upon only one end of a piece of work. Analogously, even though there have been some chucking-machine proposals, to perform added machining operations on previously partially completed individual pieces of product, these chucking machines were incapable of working upon both ends of such product. These past inadequate efforts also had the disadvantage of failing to provide good means to accurately locate work in the work holders for the machining operations. Some of these prior proposals included automatic screw machines with a plurality of work holders which, however, had the disadvantage of rotating all of the work holders at all of the stations, even at the time of loading and unloading work.

Objects of the present invention are to provide an automatic machine capable of: advantageously operating upon or machining both ends of pieces of product; accurately locating work in the machine for the machining operations to be performed thereon; rotating predetermined work holders and not rotating others, so that work may more advantageously be located in the work holders (no marring and more accurate positioning); locating and rotating work with both ends thereof exposed; exposing both ends of product being operated upon, so that an accurate and easy visual check may be made of the work at all times; gently yet accurately positioning fragile or soft work in work holders; performing machining operations upon what may be termed the inside end of work; advantageously performing divers operations simultaneously upon several pieces of work.

Novel features of the present invention resulting from the attainment of these objectives include the provision of: selecting mechanism adapted to drop pieces of work accurately one by one into a loading station in time with the step-by-step operation of the machine; mechanism to positively and very accurately locate and hold work within an open work holder until the latter is closed thereon; work holders having gentle, accurate, yet positive locating and gripping characteristics; structural arrangements to break the circuit to a prime mover or movers of the machine in the event that work should ever become jammed at the loading station; simple and yet positive and effective indexing and locking mechanism for moving and maintaining a plurality of work holders in a plurality of successive stations; mechanism for concurrently opening and closing several work holders at separate loading and unloading stations; mechanism associated with the loading mechanism for unloading or ejecting work; mechanism for supporting both ends of work holders entirely clear of the main frame, to facilitate working or machining both ends of work therein; mechanism for performing one or more operations on what might be termed the inside end of product being handled by the machine; novel machining apparatus for performing operations advantageously on the ends of work being handled by the machine; simple yet effective apparatus for operating the divers machining instrumentalities.

Other objects, features and advantages will appear hereinafter.

In the drawings, which show one of the present preferred embodiments of the invention:

Fig. 4 is a transverse sectional view taken on line 4—4 of Fig. 3.

Fig. 5 is a fragmentary view of a part of the indexing mechanism.

Fig. 6 is a fragmentary view of part of the locking mechanism.

Fig. 9 is a fragmentary side view, partially in section, of the selecting and loading mechanism.

Fig. 10 is a fragmentary sectional view of the circuit breaker taken on line 10—10 of Fig. 9.

Fig. 11 is a fragmentary sectional view of the stop and selector block, taken on line 11—11 of Fig. 9.

Fig. 12 is an enlarged sectional view of the work-handling and work-holder-operating instrumentalities at the loading and unloading stations.

Fig. 13 is a rear view of a work holder.

Fig. 14 is a sectional view of the selecting and feeding mechanism, taken on line 14—14 of Fig. 9.

Fig. 15 is a front view of the end-trimming and chamfering mechanism.

Fig. 16 is a fragmentary side view of the mechanism shown in Fig. 15.

Fig. 17 is a fragmentary top view of the mechanism shown in Figs. 15 and 16.

Fig. 18 is a front view of the rough-turning mechanism.

Fig. 19 is a fragmentary sectional view of the rough-turning mechanism, taken on line 19—19 of Fig. 18.

Fig. 20 is a fragmentary bottom view of the mechanism shown in Fig. 18, and taken in the direction of the arrow A in the latter figure.

Fig. 22 is a top plan view of the finish-turning mechanism shown in Fig. 21.

Fig. 23 is a sectional view of the finish-turning mechanism, taken on line 23—23 of Fig. 21.

Fig. 24 is an electrical wiring diagram.

Figs. 25 and 26 show modified driving mechanisms.

Fig. 27 is a diagrammatic view, showing a modified form of drive for operating the trimming and chamfering tool.

Fig. 28 is a diagrammatic view, showing a modified form of drive for the rough-turning tool.

Fig. 29 is a diagrammatic view, showing a modified form of drive for the finish-turning tool.

Figure 1:
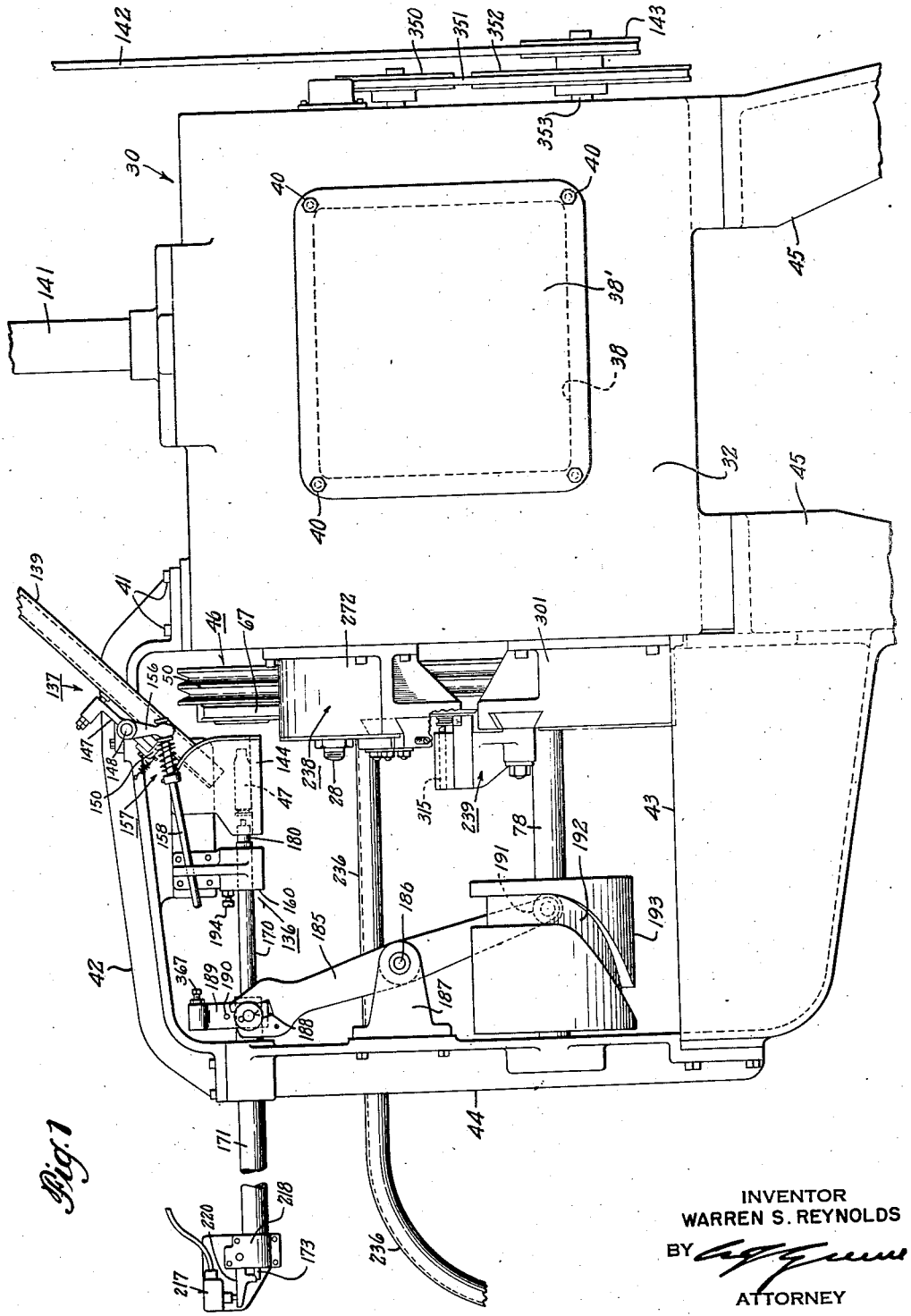
Figure 1 is a side view of the machine.
Figure 2:
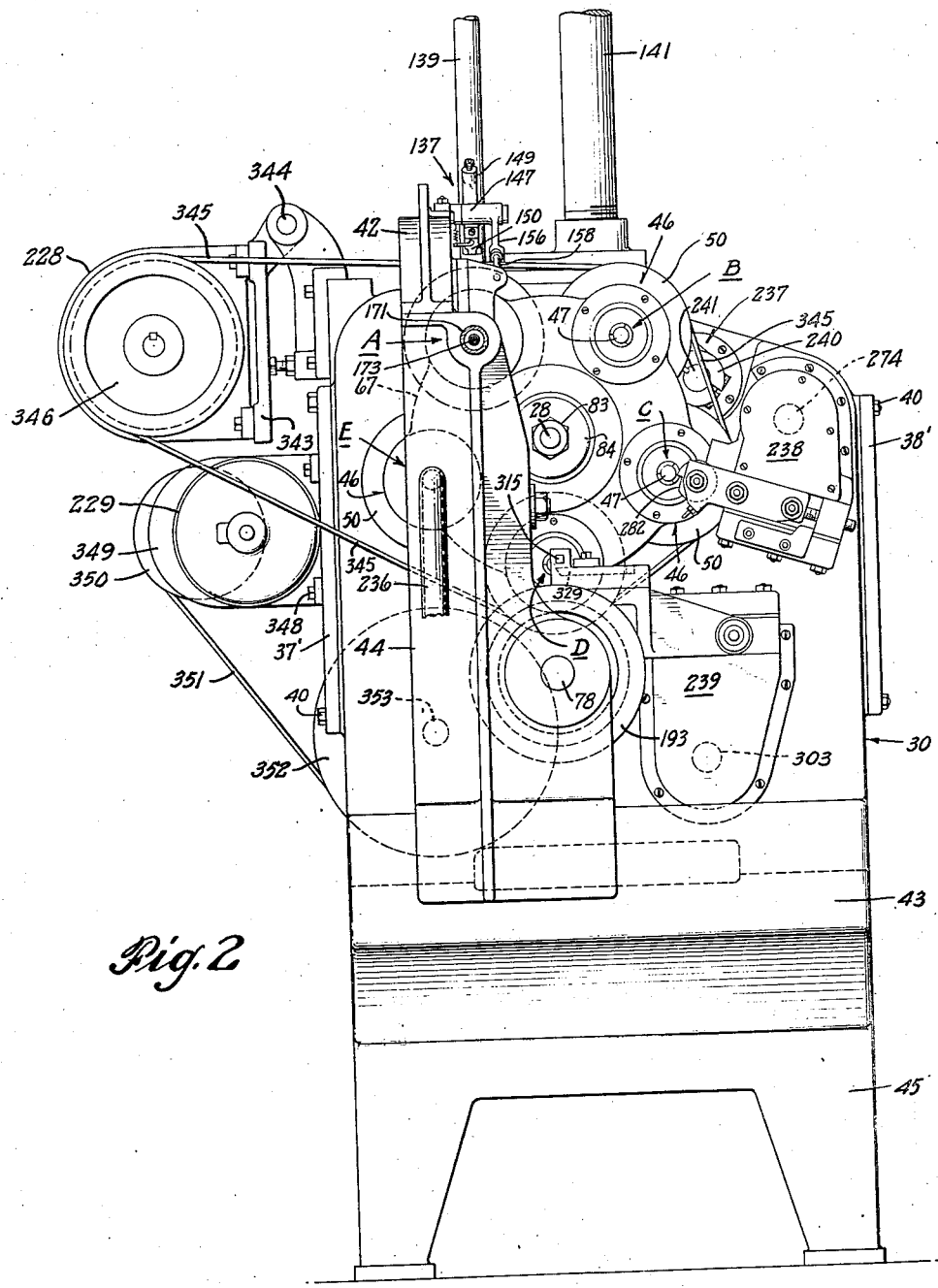
Fig. 2 is a front view of the machine.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

The specific embodiment of the automatic machine provided by the present invention, and illustrated in the present drawings, includes a main frame 30, preferably including integral side walls 31 and 32, joining integral front, rear, top and bottom walls 33, 34, 35 and 36, respectively. The side walls 31 and 32 are preferably provided with large openings 37 and 38, respectively, to facilitate coring the interior of the frame, whereby a large chamber 39 for enclosing many of the operating mechanisms of the machine may be provided. The large side wall openings 37 and 38 also facilitate internal assembly of the machine, and may be readily closed by plates 37' and 38', respectively, held in place as by screws 40.

Integral with main frame 30, or secured thereto as by screws 41, there is preferably provided an overhanging arm 42 and underlying arm 43 with a tie plate 44 therebetween. Preferably, and as shown, the main frame may have conventional machine legs 45 bolted to the underside thereof, or made integral with the main frame 30 to support the latter a predetermined or desired extent from the floor.

CARRIER AND WORK HOLDERS

It should be particularly noted that the present invention provides a novel work-handling mechanism including a plurality of work holders 46 adapted to sturdily grip pieces of work 47 yet expose both ends thereof for machining operations. One work holder 46 will now be described in detail; however, it should be understood that each of the plurality of work holders is substantially alike. To this end, attention is directed particularly to Figs. 3, 12 and 13. Each work holder 46 includes a sleevelike inner member 48 with an integral flange 49 secured to a pulley 50 as by screws 51. The inner member is provided with a bore 52 accommodating a conventional collet 53 of the normally expanded type which is adapted to be closed upon a piece of work 47 whenever an external taper 54 thereon is clamped, as by an internal taper 55 within a control member 56. The latter is supported for axial movement by the outer periphery 57 of a flange 58 thereon engaging and sliding within a bore 52 of the inner member 48. A suitable spline connection is provided between inner member 48 and control member 56 to prevent relative turning. A coil spring 59 having one end thereof engaging an inturned flange 60 on the inner sleeve 48 and the other end engaging with the outwardly extending flange 58 of the control member 56 serves to normally close the expansible collet 53. Flange nut 61 has a threaded connection 62 with the outer or front portion of the inner member 48 to lock the inner races of two sets of ball bearings to face 63 of the inner member 48 which is secured to the pulley 50.

Outer races 64 of the two ball bearings 65 are gripped and held within a suitable bore 66 of carrier head 67 as by screws 68 and 69 squeezing plates 68' and 69' at opposite sides of the bearings 65 toward each other. The latter structure prevents axial movement of the work holder 46 in the carrier head 67.

The two spaced ball bearings 65 provide a sturdy support for the collet 53 and associated mechanism whereby the latter will not wobble with respect to the carrier head 67.

Conditioning mechanism 70 is provided in each of the work holders 46 for controlling the collet 53 whereby the latter may be made to grip or to release work. This conditioning mechanism preferably includes one or more fingers 71 suitably pivoted upon pins 72 in slots 73 of the inner member 48, with additional clearance slots 73' in the pulley 50 (see Figs. 12 and 13). Normally the conditioning fingers 71 are moved in a counterclockwise direction, as seen in Fig. 12, to move the outer and longer parts of the pivoted fingers toward the rear of the machine as by the coil spring 59 urging the control member 56 toward the front of the machine, whereupon a nut 74 at the rear end thereof engages the inner and shorter section of the fingers 71.

Whenever the outer and longer ends of the fingers 71 are pressed or moved toward the front of the machine the inner ends thereof engage the nut 74 on the control member 56 to pull the latter toward the rear of the machine, whereupon the internal taper 55 thereof is moved rearwardly with respect to the mating external taper 54 of the collet 53, thereby allowing the latter to normally expand so that the work opening 75 therein is enlarged to permit ready removal and entry of work. A simple spring 76, secured to the rear face of the inner member 48 as by a screw 76', serves to maintain the collet 53 in its forward axial position during retraction of the control member 56 as by engaging the rear end of the collet 53, as may be seen clearly in Figs. 12 and 13. Rotation of the collet 53 with the inner member 48 and pulley 50 is assured through the provision of a pin 77 forced into the control member 56 with a projecting end entering a suitable keyway in the collet 53.

Of particular importance, the plurality of work holders 46, five in the present preferred showing, are all mounted in a single carrier head 67, and the carrier head is located and supported in suitable mechanism so that front and rear portions of the work holders 46 are fully spaced externally away from the outer or front wall 33 of the main frame 30, as may be seen best in Figs. 1, 3, 10 and 12. To this end, the present invention provides a sturdy carrier shaft 28 suitably mounted in bearings 79 and 80 in front and rear walls 33 and 34, respectively, of the main frame 30. The carrier shaft may be mounted for rotation directly in bearings bored in the front and rear walls 33 and 34, but is preferably, and as shown, mounted in suitable conventional ball bearings 79 and 80. Further, it is supported against longitudinal movement by any of the conventional and well-known structural arrangements for this purpose. The carrier head 67 is held against rotation on the carrier shaft 28 as by a spline connection 81, and is held against longitudinal movement thereon by a shoulder 82, nut 83 and washer 84 at the outer and front end of the carrier shaft 28.

INDEXING AND LOCKING MECHANISMS

Indexing and locking of the carrier head 67 and the associated work holders 46 therein successively into a loading station A, trimming and chamfering station B, rough-turning station C, finish-turning station D (said stations B, C and D hereinafter sometimes referred to as machining stations) and into unloading station E is efficiently and positively effected by an indexing mechanism 85 and locking mechanism 86, as may be seen best in Figs. 3 through 6.

The indexing mechanism 85 is of the Geneva type and includes a slotted generally circular plate 87 suitably secured to the carrier shaft 28, said plate being provided with a plurality of drive slots 88 equal in number to the quantity of work holders 46 provided in the carrier head 67 (five in the present instance) to accommodate a drive roller 89 pivotally mounted upon a stud 90 of a rotatable drive arm 91 suitably indirectly secured to an intermediate shaft 92.

This drive arm 91 is preferably secured to a gear 93 as by screws 94 which in turn meshes with and is driven by a gear 95 on the main shaft 78 (see Fig. 4). Thus, as the main shaft 78 is rotated, by means hereinafter described, the gear 95 meshes with and rotates gear 93 to move drive arm 91 and roller 89 thereon in a counterclockwise direction as viewed in Fig. 4, whereupon the roller successively enters drive slots 88 at the station F and moves the plate 87 and associated carrier head 67 72 degrees, whereupon the roller leaves the slot in the station G as shown in Fig. 4. The index plate 87 and associated carrier head 67 remain in the indexed position all of the time that the roller 89 and drive arm 91 rotate from the position shown in Fig. 4 until the roller enters the next successive slot 88 at station F. During this interval loading, unloading and machining instrumentalities hereinafter described in detail operate upon the work 47 in the work holders 46.

Figure 3:
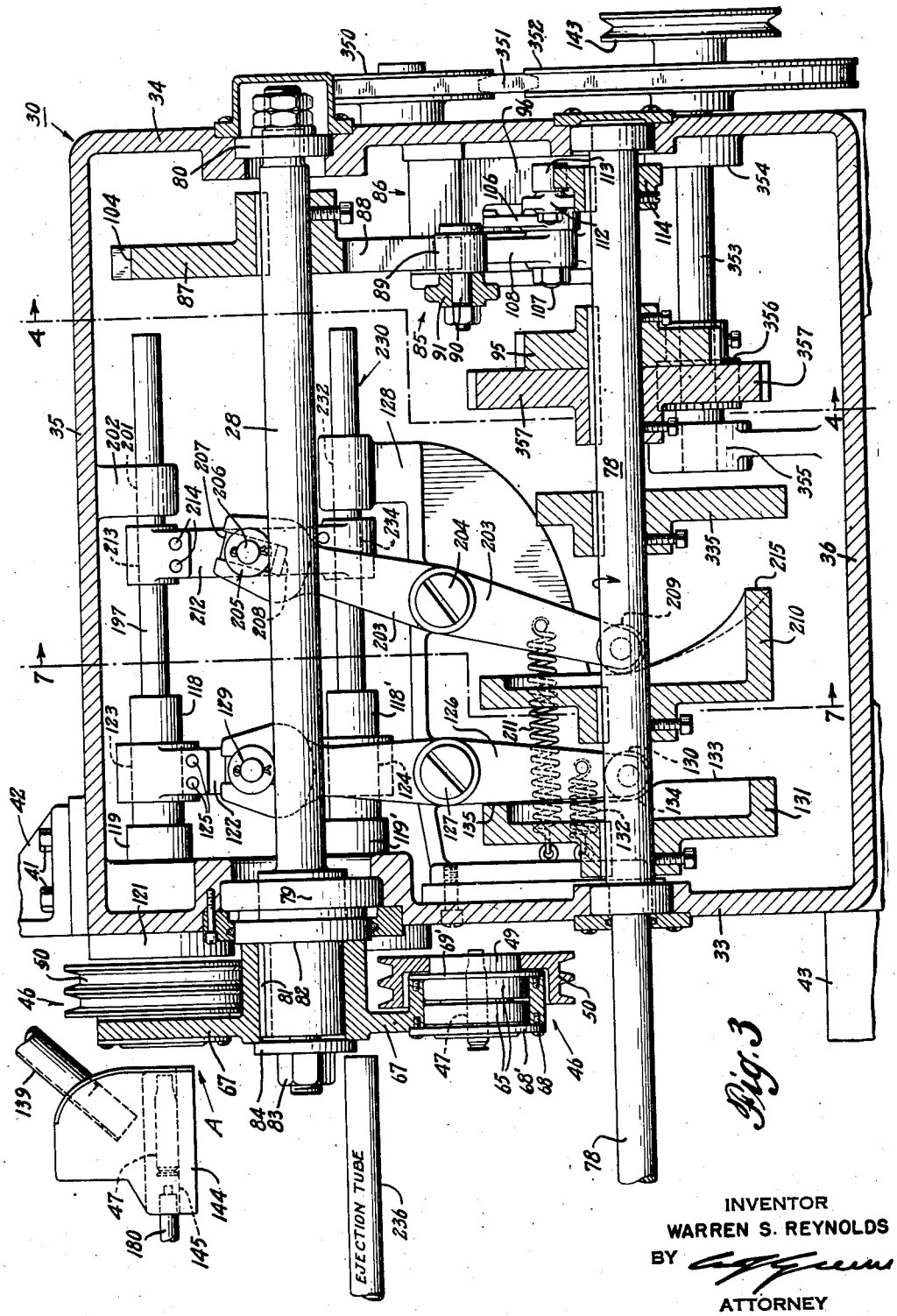
Fig. 3 is a longitudinal sectional view taken on line 3—3 of Fig. 2.

The locking mechanism 86 for maintaining the index plate 87 and associated work holders 46 in successive stations, in the present preferred form as best shown in Figs. 3, 4 and 6, includes a housing 96 suitably secured to rear wall 34 (see Fig. 6). The housing is provided with a generally vertically extending channel 97 to accommodate a plunger 98, which is held therein by a top plate 99 suitably secured to the housing 96 (Figs. 4 and 6). The plunger 98 is preferably provided with a bore 100 accommodating one end of a coil spring 101 while the other end of the coil spring is socketed in an adjustment screw 102 threaded into an upstanding lug 103 on the housing 96 (Figs. 4 and 6). A plurality of notches 104 are provided in the periphery of the index plate 87 intermediate the drive slots 88. These notches 104 are equal in number to the drive slots 88 and holders 46 in the carrier head 67 and are intended to accommodate the upper end of the plunger 98. They are preferably provided with at least one angular wall 105 so that the plunger 98 as it is forced therein by spring 101 tends to complete arcuate movement of the index plate 87 into its proper indexed position, should the roller 89 become worn or otherwise fail to move the index plate far enough arcuately.

Mechanism for synchronizing movement of the locking plunger 98 into successive notches 104 as the drive roller 89 and drive arm 91 leave the index plate 87 at the station G, to maintain the index plate and associated holders 46 sturdily in the stations A through E for a predetermined length of time, and until the drive roller 89 of drive arm 91 begins to enter a successive drive slot 88 and begins to again move the index plate 87 and associated work holders 46 arcuately into a successive station, includes a bell crank 106 pivotally mounted upon a stud 107 suitably secured to a projection 108 with an upper finger 109 thereof extending into a suitable substantially horizontal clearance channel 110 in housing 96 for engagement with a suitable stud 111 on the plunger 98. The bell crank 106 also includes an integral lower finger 112 with a roller 113 engaging a cam 114 having a suitable connection with main shaft 78 as may be seen best in Fig. 4.

The cam 114 is provided with a lobe 115 and receding wall 116 adapted to allow the bell crank 106 to be moved in a clockwise direction as viewed in Fig. 4 under the influence of the coil spring 101 and to concurrently allow the plunger 98 to enter one of the notches 104 in the index plate 87 as the drive roller 89 and drive arm 91 leave the index plate at station G. This same cam is also provided with a riser section 117 extending to the lobe 115 adapted to move and maintain the bell crank 106 in its counterclockwise position whereupon the upper finger 109 engaging stud 111 moves the plunger 98 against the pressure of the coil spring 101 until the upper end thereof is entirely clear of the index plate 87 as the drive roller 89 on drive arm 91 enters a successive drive slot 88 at station F whereby the index plate 87 is again free for arcuate movement.

WORK-HOLDER-CONDITIONING MECHANISM

It should be particularly noted that the present invention provides mechanism for automatically conditioning the work holders; that is, causing the same to hold or to release work therein, and to concurrently effect such conditioning in two stations, viz., the loading station A and the unloading station E.

For this purpose the present invention provides a pair of sleeves 118 and 118', at stations A and E, mounted for reciprocating movement in preferably in suitable bearings 119 and 119' in front wall 33. These sleeves are preferably provided with flangelike heads 120 and 120' and rings 121 and 121' with the latter adapted to overlie, engage and operate fingers 71 of work holders 46. In the latter connection, the rings 121 and 121' engage the outer ends of the fingers 71 when the sleeves 118 and 118' are moved to the left as viewed in Fig. 12, thereby moving the outer ends of the fingers 71 to the right as viewed in Fig. 12, whereupon the collet 53 is released in the manner hereinbefore described in detail. Similarly, the fingers 71 are released and the control members 56 (at stations A and E) are allowed to move toward the left under the influence of the springs 59 to tighten collets 53 whenever the sleeves 118 and 118' are moved to the retracted position shown in Fig. 12. If preferred, the rings 121 and 121' may be made integral with the sleeves 118 and 118'.

Figure 7:
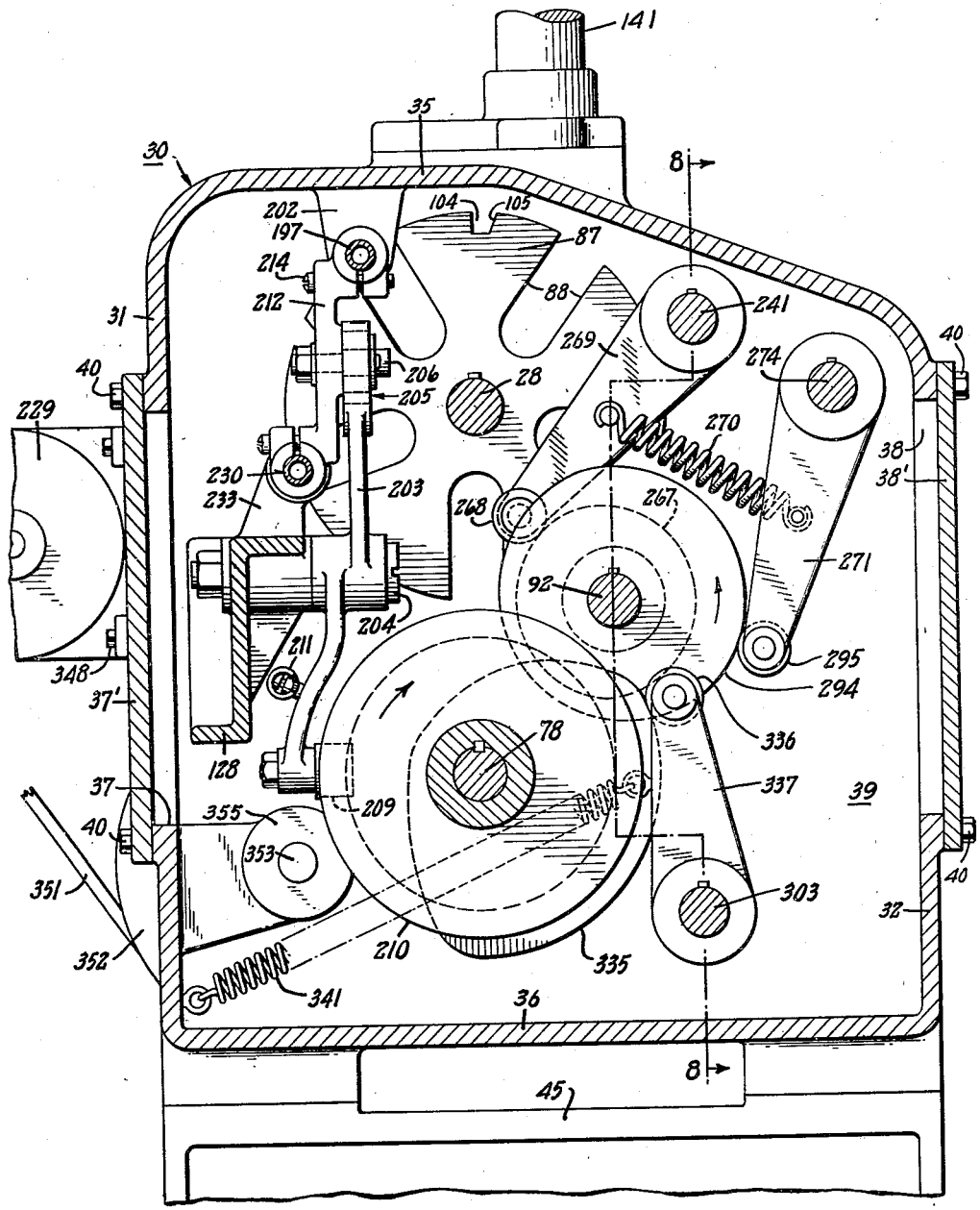
Fig. 7 is a transverse sectional view, similar to Fig. 4 but taken on line 7—7 of Fig. 3.

Concurrent operation of the sleeves 118 and 118' is effected by tie block 122 as by having split bores 123 and 124 with clamping screws 125. Automatic operation of said sleeves 118 and 118' for conditioning the work holders 46, concurrently with the indexing of the work holders as hereinbefore described in detail, is effected through the provision of a lever 126 pivotally mounted upon a stud 127 in a suitable standard 128 suitably secured to or integral with front wall 33 (Figs. 3, 7 and 12). This lever at its upper end has a pin-and-slot connection 129 with the tie block 122 and at its lower end has a roller 130 engaging a face cam 131 suitably secured to main shaft 78. A coil spring 132 extending between and having suitable pin connections with the lever 126 and standard 128 is provided to maintain the roller 130 in operative engagement with the face cam 131 and thereby to also normally urge the sleeves 118 and 118' into the retracted position shown in Fig. 12.

High lobe 133 on cam 131 serves to move the lever 126 about the stud 127 in a counterclockwise direction and thereby moves sleeves 118 and 118' (or rings 121 and 121') into engagement with work holders 46 in stations A and E to release the work holders. Receding and low sections 134 and 135, respectively, on cam 131 allow spring 132 to move the lever 126 in a clockwise direction whereupon sleeves 118 and 118' are cleared of fingers 71 and thereby allow internal taper 55 of control member 56 under influence of spring 59 to close collets 53 to grip and hold work 47.

SELECTING, FEEDING AND LOCATING MECHANISMS

In order to intermittently feed and locate successive pieces of work 47 into work holders 46 at the loading station A, the present invention provides a novel feeding mechanism 136 including a selecting mechanism 137 and locating mechanism 138 adapted to be coordinately operated, preferably by main shaft 78, in a step-by-step manner simultaneously with the operation of the indexing mechanism 85.

*Selecting mechanism*

The selecting mechanism 137 (Figs. 1, 2, 9, 11 and 14) includes an inlet tube 139 extending generally downwardly and forwardly of the machine. This tube may be loaded by hand with a successive series of pieces of work, with flanges 140 thereon leading; or may be loaded automatically by a suitable and conventional hopper (not shown) supported on a standard 141 from the top of the frame 30, which hopper may be operated by an individual motor or by a belt 142 driven from a pulley 143 at the rearmost end of the drive shaft 353. The lower end of the tube 139 extends into a housing 144 having a channel 145 coaxial with bores in work holders 46 when the latter are in the loading station A. This housing 144 may be integral with arm 42 or may be secured thereto as by screws 146. The tube 139 may be welded or otherwise suitably secured to the arm 42 and housing 144.

A detent arm 147 is pivotally mounted upon a stud 148 extending to arm 42 and includes a primary detent 149 at the upper end thereof and a secondary detent 150 at the lower end thereof with both of said detents passing through suitable adjacent apertures at the top of the tube 139. The detent arm 147 is normally maintained in its most clockwise position shown in Fig. 9 as by a spring 151, in which position the primary detent 149 is moved into engagement with the lower end of a piece of work 47 in the tube 139. However, as the detent arm 147 is moved in a counterclockwise direction, as viewed in Fig. 9, against tension of spring 151 secondary detent 150 is moved from a position clear of bore 139' and tube 139 to a position within the tube, while the primary detent 149 is moved to an inoperative position relative to the bore 139' and work therein whereupon the piece of work which the primary detent previously held drops downwardly in the tube with the leading end thereof engaging secondary detent 150.

Preferably the primary detent is in the form of a plunger 152 backed by a spring 153 and having its downward movement limited by a screw extension 154 and nuts 155 (Fig. 9) which enables the primary detent 149 to hold a piece of work until the secondary detent 150 is in its operative position within the tube 139, before the primary detent moves into its inoperative position clear of tube 139, and conversely to move down into engagement with a piece of work before the secondary detent 150 is again moved clear of the bore 139'. The detent arm 147 is provided with an integral control arm 156 all suitably pivoted on stud 148, while said control arm has a suitable spring connection 157 with a pusher rod 158 having a slidable connection with a suitable bore 159 in bracket 160. The spring connection 157 includes a suitable bore 161 of larger diameter than the pusher rod 158 in the lower end of the control arm 156 with a head 162 on said rod 158 engaging one side of the arm while a washer 163, spring 164 and collar 165 at the opposite side thereof serve to maintain the head in engagement with the arm 156.

As the pusher rod 158 is positioned either manually, or automatically as described shortly, the spring-and-collar-backed washer 163 moves the control arm 156 and integral detent arm 147 in a counterclockwise direction, whereupon the primary detent 149 is moved to the inoperative position, free of the bore 139' of the tube 139 and work 47 therein, so that the piece of work which the primary detent had been holding drops downwardly through the tube into engagement with the secondary detent 150. As the pusher rod 158 is released, the control arm 156 and integral detent arm 147 are rotated in a clockwise direction whereupon the primary detent 149 engages the next succeeding piece of work as shown in Fig. 1, which is held in this position longitudinally of the tube 139 by the piece of work 47 being held by the secondary detent 150 until the secondary detent is free of the bore 139' of the tube 139 to allow the piece of work which it was holding to drop into the channel 145 of the housing 144 with the flange end 140 thereof extending toward the front of the machine and with nose 166 thereof pointing toward the rear of the machine as may be seen best in Fig. 9.

Feeding (or loading) mechanism

Feeding mechanism 136 for moving successive pieces of work 47 from the channel 145 into work holders 46 as the latter successively arrive at loading station A includes a ram 167 mounted for free axial movement in suitable bores 168 and 169 in the bracket support 160 and tie plate 44. The ram 167 preferably includes an inner sleeve 170 and associated outer sleeve 171 with the inner sleeve locatable and slidable within a bore 172 of the outer sleeve as may be seen best in Fig. 9. A rod 173 is secured to the inner sleeve 170 as by a pin 174 and is provided with a coil spring 175 extending to a plug 176 at the front of the outer sleeve 171. This plug is provided with a bore 177 adapted to slidably accommodate the front end of the rod 173. The spring 175 is of sufficient length and compression to normally axially spread the inner and outer sleeves apart until a flange 178 on the inner sleeve 170 engages a shoulder 179 within the outer sleeve 171. The inner sleeve is also provided with a head 180 having a shank 181 secured thereto as by a pin 182 with a tip adapted to slide into a usual percussion cap hole in the work 47.

By moving the outer sleeve 171 to the right as viewed in Fig. 9 the plug 176 pushes against the spring 175 which in turn pushes the inner sleeve 170 and head 180 into engagement with head 184 of the work 47 to force the same axially of the channel 145 in the housing 144 into work holder 46 at the loading station A.

Movement of the outer sleeve 171, and in fact the entire ram 167, preferably includes a lever 185 of the first class, pivotally mounted upon a stud 186 in a bracket 187 on the tie plate 44, with the upper end thereof having a suitable pin-and-slot connection 188 to a finger 189 screwed upon the rear end of the outer sleeve 171 and tightened thereon in suitable location as by a transverse screw 190. The lower end of the lever 185 is provided with a suitable roller connection 191 adapted to enter a slot 192 of a channeled or drum cam 193 suitably secured to main shaft 78 forwardly and externally of the main frame 30 adjacent the tie plate 44.

As the main shaft 78 and the cam 193 thereon rotate the channel 192 through the roller connection 191' moves the lever 185 in a clockwise direction so that the upper end thereof through the pin-and-slot connection 188 and associated mechanism moves the ram 167 to the right, and the work 47 from the channel 145 into the work holder 46, until finger 189 engages a stop screw 194 on the bracket 160 as shown by dot-and-dash lines in Fig. 9.

Locating mechanism

Locating mechanism 138 (Figs. 3, 7 and 12 particularly) is also provided to cooperate with the feeding mechanism 136 for the purpose of accurately positioning work 47 in successive work holders 46, at the loading station A, cooperating with the means to limit the extent to which the head 180 of ram 167 may be moved toward the work holders 46 after the latter arrive at the loading station A. This means includes the adjustable stop screw 194 which limits the extent to which the finger 189, outer sleeve 171 and inner sleeve 170 (through the flange 178 and shoulder 179) are moved to the right. Further adjustment of the ram 167 with respect to the cam 193 may be accomplished as by the screw connection 189' and by suitably affixing the cam 193 at divers slightly different places on the main shaft 78.

The locating mechanism also preferably includes a plunger 195 (Figs. 3 and 12) slidable within a bore 196 of a locator rod 197 with axial movement thereof limited by a pin-and-slot connection 198. A light spring 199 (lighter in pressure than spring 175) is provided with one end thereof engaging a bottom of bore 196 and with the other end thereof engaging the back of the plunger 195. The rod is mounted for axial and slidable movement in a bore 200 of the sleeve 118, as may be seen best in Fig. 12, and preferably also in a suitable bore 201 in a lug 202 depending from the top 35 of the main frame 30. Movement of the locator rod 197 and plunger 195 to the left, from the inoperative position shown in Fig. 12 into engagement with nose 166 of work 47 in the channel 145 or as such work is being pushed into the work holder 46 at the station A as by ram 167, is effected by a lever 203, of the first class, axially mounted on a stud 204 suitably secured to a rearwardly extending standard 128 secured to the front wall 33 of the main frame 30. This lever 203 has a pin-and-slot connection 205 including a stud 206, block 207 and slot 208 at its upper end, and a roller 209 at its lower end engaging and riding upon a face cam 210 suitably secured to main shaft 78.

The lever 203 is urged in a clockwise direction against the face cam 210 as by a coil spring 211 connected to the lever 203 at one end and to the standard 128 at its other end. The lever 203 at its upper end and through the pin-and-slot connection 205 is associated with a tie-bar 212 secured to the locator rod 197 as by a split bore 213 and bolts 214. High lobe 215 on the face cam 210 is arranged to move the locator rod 197 and plunger 195 to the left, preferably at about the time that the ram 167 begins to push the work 47 from the channel 145 into the work holder 46 so that bevelled point 216 of the plunger 195 cooperates with the tip 183 and the head 180 of the ram 167 to centralize and carry work relative to the work holder at the station A.

Concurrently with the travel of the ram 167 to the right and toward the final loading position (see Figs. 3 and 9) the face cam 210 through the lever 203 and pin-and-slot connection 205 moves the locator rod 197 and plunger 195 to the left as viewed in Fig. 12. However, the plunger 195 is in effect ahead of the ram 167 so that there is a gripping action between the plunger 195 and head 180. Because the spring 199 is lighter in pressure than the spring 175 the plunger 195 yields for variations in length of the work so that the head 184 of work is always accurately spaced and held relative to the work holders during clamping of the work holders. The mechanism just described in considerable detail effectively and accurately locates work in work holders at the loading station A.

In the event that work jams anywhere at or between the housing 144 and work holder 46 at the loading station A outer sleeve 171 may still be moved in the normal manner by lever 185 and may travel a great extent relative to the inner sleeve 170. However, ram 167, and particularly inner sleeve 170 and head 180, will not be harmfully pushed against the jammed work since the coil spring 175 and plug 176 allow the inner sleeve 170 and head 180 thereon to stop when the same engage jammed work while the outer sleeve 171 under the influence of the lever 185 ineffectively rides over the inner sleeve 170.

SAFETY SWITCH

Optionally, and preferably, the present invention includes a safety switch 217 adapted to cut out the prime mover whenever work is jammed in the machine (Figs. 9, 10 and 24), including a normally closed switch upon a collar 218 secured to the forward end of outer sleeve 171 as by screws 219. A bell crank 220 is pivotally mounted on a stud 221 in a slot 222 in the collar 218 and has a downwardly extending finger 223 resting upon a bevel 224 of the rod 173 with a horizontally extending finger 225 engaging actuating plunger 226 of the switch 217. The latter may be any conventional "micro" switch requiring relatively small movement for actuation. Thus, as the outer sleeve 171 travels to the right over the inner sleeve 170 and over the rod 173 (when work is jammed and stops sleeve 170 and head 180) the bevel 224 causes the bell crank 220 to move in a clockwise direction against the actuator 226 of the switch 217 to open the circuit. When this switch is so opened flow of current from a source of power 227 to the prime mover 228 and/or 229 (more fully described hereinafter) is interrupted.

UNLOADING MECHANISM

Concurrently with the loading of work at the station A as just described in considerable detail, unloading of finished work is effected at station E with a simple yet very effective mechanism including an ejector rod 230 having an axially slidable connection with a bore 231 in sleeve 118' at station E and with a bore 232 in lug 233 on standard 128 (Fig. 12). The ejector rod 230 is secured to a suitable split bore 234 in tie-bar 212 as by screws 235 for concurrent movement with the said bar 212. Thus, as the tie-bar 212 is moved by the lever 203 as hereinbefore described in detail in connection with the operation of said bar and lever for controlling the locator plunger 195 and rod 197 at the loading station A the ejector rod 230 is concurrently moved to the left as viewed in Fig. 12 into engagement with nose 166 of work 47 concurrently with or just subsequent to release of the work-holder-conditioning means by the head 180 at the unloading station E to move work entirely clear of the work holder into unloading tube 236 which shunts successive pieces of work to any preferred location such as a container (not shown) extraneous of the machine.

MACHINING TOOLS AND STATIONS

The present preferred form of the machine discloses three separate machining stations; however, it will be appreciated that other machines within the purview of this invention may be made with more or fewer stations. Those shown herein, for illustrative purposes, include end-trimming and chamfering mechanism 237 at station B, rough-turning mechanism 238 at station C, and finish-turning mechanism 239 at station D.

End-trimming and chamfering mechanism

Figure 8:
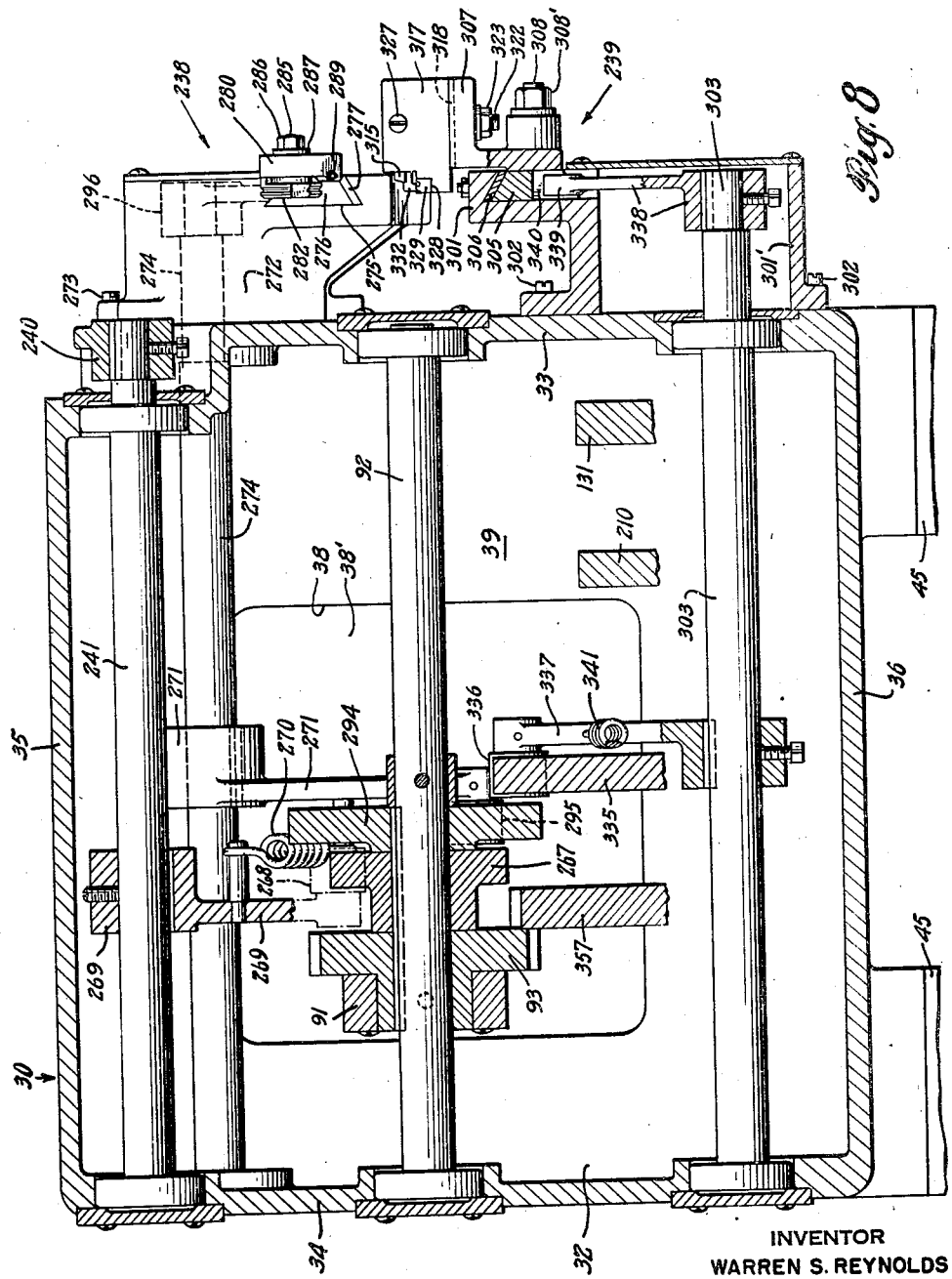
Fig. 8 is a longitudinal sectional view taken on line 8—8 of Fig. 7.

The end-trimming and chamfering mechanism 237 includes a tool carrier arm 240 suitably secured to a shaft 241 (Figs. 7, 8 and 15). At its upper end the tool carrier arm 240 supports a slide 242 preferably having a tongue-and-groove connection 243. The slide 242 is provided with a channel 244 to receive a tool bit 245. The latter is longitudinally adjusted in the channel as by a screw 246 and is securely held in the adjusted position by a pair of clamping screws 247. A bolt 248 threaded into the carrier arm 240 and having a flange 249 overlying the tongue of the tongue-and-groove connection 243 serves to locate and maintain tool bit 245 longitudinally relative to the nose 166 of work 47 in a work holder 46 to effectively and accurately trim it to length. After the slide 242 is longitudinally positioned in the desired station by the single bolt 248 it may be securely clamped to the carrier arm 240 as by screws 250 extending downwardly through suitably elongated slots in the slide to suitable threaded holes in the carrier arm 240. A pocket or recess 251 is provided in the front wall 33 of the main frame 30 to accommodate the tool carrier arm 240, and a chamfering tool 252 about to be described, so that trimming and chamfering may be effected readily between the carrier head 67 and the front wall 33 of the main frame 30.

The chamfering tool 252 includes a block 253 integral with or, as shown, secured as with screws 254 on front wall 33 within recess 251. This block is provided with a stud 255 upon which a tool carrier 256 is pivotally mounted. This carrier 256 is provided with a channel 257 in which a tool bit 258 may be securely held as by a clamping plate 259 and bolt 260 (Fig. 15). Longitudinal setting and maintaining of the tool bit 258 in said channel 257 may be effected by a set screw 261. Normally the carrier 256 is maintained in the dot-and-dash-line position 262 shown in Fig. 16 against stop 263 as by coil spring 264 in order to maintain tool bit 258 entirely clear of nose 166 on work 47 as work holders 46 with work therein are moved from loading station A to machining station B. Movement of the chamfering tool bit 258 into the operative position shown in Fig. 16 after a work holder is moved into station A is effected by arcuate movement of tool carrier arm 240 from the dot-and-dash line position 265 to the solid-line position shown in Fig. 15, for as the tool carrier arm 240 moves in a counterclockwise direction it engages a stud 266 on chamfering tool carrier 256 to sweep the latter in a clockwise direction against the tension of spring 264 as viewed in Fig. 16 until the tool bit 258 is within the bore of work 47. Preferably the arrangement of these instrumentalities is such that the end-trimming tool 245 has completed its trimming operation prior to the time the chamfering tool bit 258 completes its chamfering operation.

Movement of the tool bits 245 and 258 through the carrier arm 240 and tool carrier 256 is effected by a cam 267 on intermediate shaft 92 engaging a roller 268 on an arm 269 secured to the tool-operating shaft 241. This cam 267 imparts limited arcuate movement to the arm 269 whereupon the attached tool-operating shaft 241 through the carrier arm 240 and tool carrier 256, in the manner hereinbefore described in detail, moves the tool bits 245 and 258 into and out of operative position. A coil spring 270 connected to the arm 269 at one end and to another arm 271 serves to move the end-trimming tool bit 245, and associated chamfering tool bit 258, in one direction relative to the work while the cam 267 serves to move them in another direction.

Rough-turning mechanism

The rough-turning mechanism 238 includes a bracket 272 secured to the front wall 33 of the main frame 30 as by screws 273. Said bracket has a substantially integral housing 272' enveloping an outer end of tool-operating shaft 274, and includes a dovetail channel 275 to accommodate a tool slide 276. A gib 277 with adjusting screws 278 and lock nuts 279 is provided to insure a snug fit of the slide 276 in the bracket 272. A tool carrier 280 in the form of a block having a tongue-and-slot connection 281 to the slide 276 is provided to effect transverse location of a circular cutter 282 relative to the work holder 46. This circular cutter 282 is of conventional type and includes a plurality of diameters, which are in the present instance arranged to rough-turn a groove 300 and flange 140 on head 184 on work 47. Screw 283 in upstanding lug 284 on slide 276 is engageable with an end on tool carrier 280 to set and maintain the tool carrier longitudinally relative to the slide 276. A pair of studs 285 affixed to the slide 276 extend upwardly through suitable elongated apertures in tool carrier 280 sufficiently to accommodate washers 286 and nuts 287 which serve to lock the tool carrier 280 in the desired position on the slide 276.

At its inner end the tool carrier 280 is provided with a stud 288 to securely clamp a circular cutter 282 and is preferably provided with a smaller screw-and-lock nut 289 adapted to engage a wall 290 on the circular cutter 282 to effect arcuate adjustments of the latter prior to tightening it with the bolt 288 and to assist the latter in maintaining the circular cutter in the desired arcuately set position. Movement of the slide 276, tool carrier 280 and cutter 282 toward the center of the work holder 46 while the latter is in the station C is limited by a stop 291, secured to the bracket 272 as by bolts 292 and pins 293, engaging the lug 284 on the slide 276.

Power feed of the slide 276 and associated cutter 282 relative to work holders 46 at station C is effected by a cam 294 suitably secured on intermediate shaft 92 engaging a roller 295 on downwardly extending arm 271 secured to tool-operating shaft 274. The latter in turn has a downwardly extending arm 296 suitably secured to its outer end (Figs. 18 and 19) with a partially circular end 297 on the arm entering a snug fitting slot 298 in the slide 276. Cam 294, through the mechanism just described in detail, serves to move the cutter 282 in one direction relative to the work holder 46 in the station C, while spring 270 connected to the arm 271 and to the arm 269 serves to move said cutter in the opposite direction. The cam 294 is suitably developed to permit machining only while the work holders are at station C and to cause the cutter 282 to be entirely clear of work (back in the dot-and-dash-line position 299) while the work holders are indexed into and out of the station C.

*Finish-turning mechanism*

Figure 21:
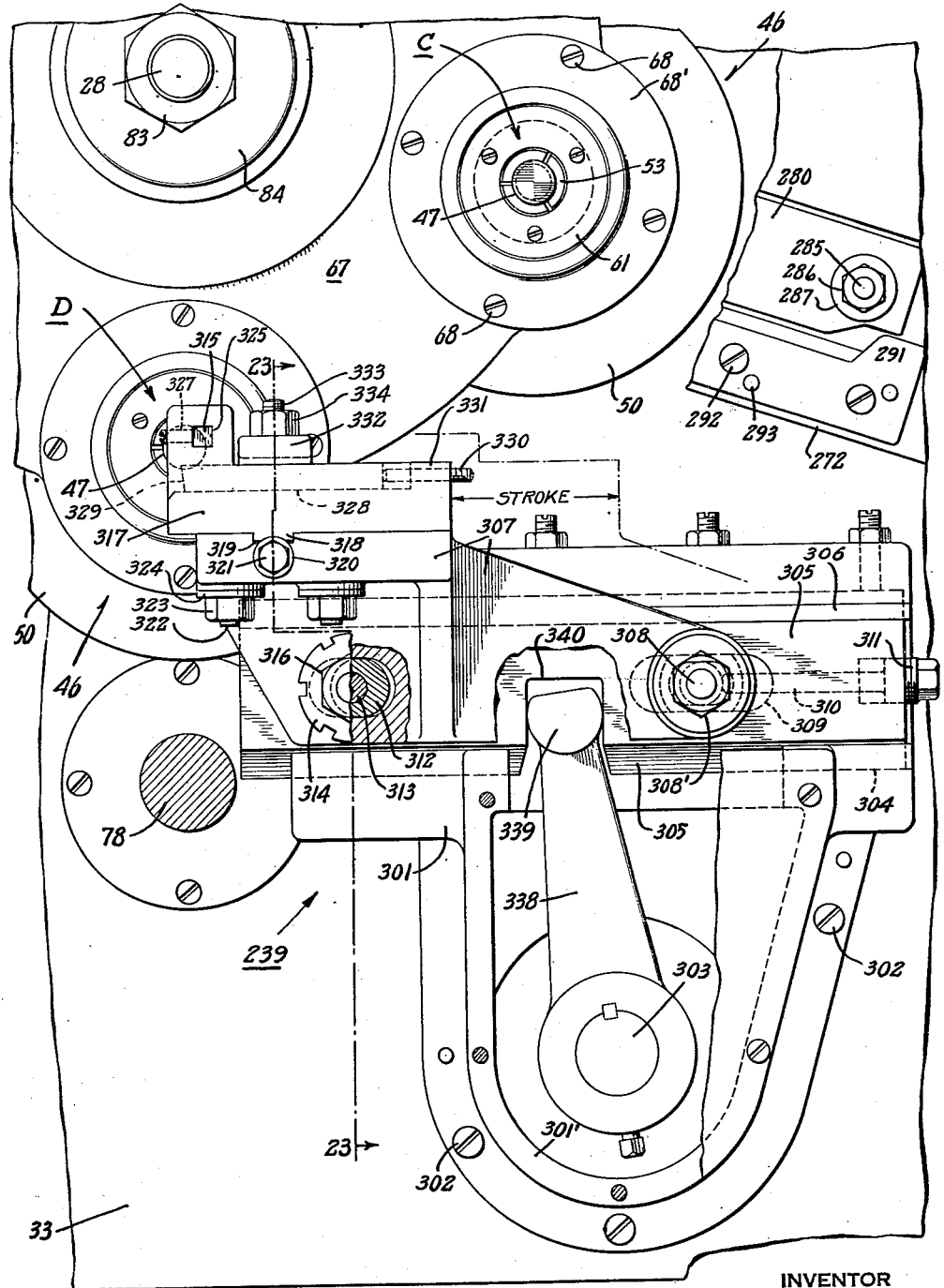
Fig. 21 is a front plan view of the finish-turning mechanism.

The finish-turning mechanism 239 includes a bracket 301 suitably secured to front wall 33 on the main frame 30 as by filister head screws 302 with an integral housing 301' enveloping outer end of tool-operating shaft 303 (Fig. 21). This bracket is provided with a preferably dovetail channel 304 accommodating a slide 305, which is snugly held in place as by a usual gib structure 306. A tool holder 307 is pivotally mounted upon the slide 305 through the provision of a stud 308 having the head end thereof slidably held in suitable elongated slot 309 in the slide 305. The tool holder 307 may be moved into various longitudinal positions relative to the slide 305 as by a stud 310 having a thread connection 311 in the outer end of the slide 305 engaging a side of the stud 308 to push the latter and the associated tool holder 307 relative to the slide. It is preferably held in the adjusted position by lightly tightening a nut 308' at the outer end of the stud 308.

Arcuate positioning of the tool holder 307 is effected by an eccentric sleeve 312 on a stud 313 and includes a flange 314 with suitable slots for an adjustment wrench (see Figs. 21 and 23). After the eccentric sleeve 312 is rotated into the desired arcuate position sufficiently to lift or to lower the tool holder 307 and a cutter or tool bit 315 into the proper position relative to the center of work 47, nut 316 is tightened upon the outer end of stud 313 and at the same time a final tightening is given to the nut 308' at the outer end of the stud 308.

At its upper end tool holder 307 is provided with a slide 317 having a tongue 318 riding in a slot 319 to guide said slide in movement toward the front and rear of the machine. Flange 320 on screw 321 having a threaded connection in tool holder 307 engages said tongue 318 to move the slide 317 toward the work holders 46, at the station D. A pair of bolts 322 secured to the slide 317 and extending downwardly through suitable elongated slots in the tool holder 307 with nuts 323 and washers 324 at the bottom ends thereof serve to clamp the slide 317 in the desired position on the tool holder 307 (Fig. 23). This slide is provided with a square bore 325 to receive a tool bit 315 which is held therein by a screw 327 and serves to face the head 184 of work 47.

The slide 317 is also provided with a notch 328 adapted to receive another tool bit 329 having suitable grooves and ridges to qualify or finish-turn the flange 140 and channel 300. The latter tool bit 329 may be adjusted longitudinally of the slide 317 as by a screw 330 and lug 331 and may be held in the recess as by clamping plate 332, stud 333 and nut 334.

Reciprocation of the finish-turning slide 305, with the associated tool bits 315 and 329, is effected by a cam 335 on the main shaft 78 engaging a roller 336 on arm 337 suitably secured to the tool-operating shaft 303. The latter at its outer end has an upwardly extending arm 338 suitably secured thereto. This arm has a ball-like end 339 engaging and snugly fitting within a slot 340 at the underside of the slide 305. The cam 335, through the mechanism just described in detail, serves to move the slide 305 and the tool bits 315 and 329 in one direction while a spring 341 connected to arm 337 and to main frame 30 as by eyelets serves to move said tools in the opposite direction relative to work in the work holders at the station D.

Figs. 27, 28 and 29 diagrammatically disclose slightly modified mechanism for operating said aforementioned cutting tools at stations B, C and/or D. In the drive for the tools hereinbefore described in detail, springs 270 and 341 serve to move the divers tools into operative engagement with the work while cams 267, 294 and 335 serve to move the same to retracted or inoperative positions. Since the machining includes only light cuts on soft nonferrous metal the springs suffice for the working load.

However, for heavier loads the reverse may be preferable at certain or all of the station B, C and D (see Figs. 27, 28 and 29). Arms 269', 271', and 337' replacing arms 269, 271 and 337, and cams 267', 294' and 335' replacing cams 267, 294 and 335 work on the opposite side of the shafts 241, 274 and 303, respectively, so that the cams move the tools into the work 47 and springs 270', 270'' and 341 suitably secured within the frame serve to move the tools from the work to the retracted or inoperative position. In this latter connection the modified tool drives just described may replace the tool drives first described in considerable detail at any or all of the stations B, C and D, and the springs for maintaining the arms 269', 271' and 337' on the cams 267', 294' and 335', and for thereby moving the associated tools to inoperative position, may be of conventional type and may be suitably secured to the frame 30.

DRIVING MECHANISM

One form of driving mechanism, shown in Figs. 1 through 7, includes an electric motor 228 suspended on a swing frame 343 from a pivot stud 344 with a pair of belts 345 extending from drive pulley 346 on motor 228 to pulleys 50 on work holders 46 in only the machining stations B, C and D, in such a manner that the work holders are rotated at said latter stations, but are not engaged by the belts and are not rotated in either the loading or unloading stations A and E. respectively. This is highly advantageous since the stationary or nonrotating work holder at loading station A provides a more effective control of the work at the time of locating it in the work holder; minimizes the chances of scratching or marring the work; and, minimizes the chances of jamming the work. Similarly, it minimizes the chances of marring and/or jamming the work at the unloading station E.

Another motor 229 is secured to the side wall 31 of the main frame 30 as by bolts 348 and is provided with a conventional gear reduction unit 349. The gear reduction unit has a drive pulley 350 secured thereto accommodating a belting 351 extending to a pulley 352 on drive shaft 353 shown in Fig. 3. This drive shaft is suitably mounted against longitudinal movement and for rotation in bearings 354 and 355 of the main frame 30. It has a gear 356 driving a gear 357 suitably secured to main shaft 78, and thereby effects rotation of the main shaft to operate all the instrumentalities associated with the latter.

The circuit shown in Fig. 24 and hereinbefore described in some detail may be used to control operation of said motors 228 and 229.

MODIFIED DRIVING MECHANISM

Alternatively to the driving mechanism just described in considerable detail, which required two electric motors, and as shown in Fig. 25, the motor 228 may be provided with a connection 358 directly to a gear reduction unit 349' and the latter in turn provided with the pulley 350 and belting 351 connection to the drive shaft 353. Thus, one electric motor serves to selectively drive the work holders 46 and all of the operating instrumentalities actuated by the drive shaft 353 and main shaft 78.

With either the regular two-motor driving mechanism first described or the modified one-motor driving mechanism, and for simplification of mechanism within the main frame, there may be a modified drive between the reduction unit 349 or 349' and the main shaft 78 (Fig. 26) including a chain 359 connected to suitable sprocket 360 (on the gear reduction unit 349 or 349'), said chain extending to a sprocket 361 directly on the main shaft 78, thereby dispensing with the drive shaft 353. In the latter event the gear reduction unit used is such that the speed of the main shaft is the same as when the drive shaft 353 is used.

CIRCUIT FOR DRIVING MECHANISMS

Conventional wiring may be employed for directing current to the motor 228, and the motor 229 also when the latter is employed, as in the regular driving mechanism including leads 362, 362', 363 and 363' extending to any suitable source of current 227 with leads 362 and 362' extending directly to terminal 364 on motors 228 and 229, respectively, and with the other leads 363 and 363' extending to terminal 365 on said motors. A switch 366 may be employed to cut-in electricity from the source of current 227 to the motors 228 and 229. Preferably and as hereinbefore described in detail, the present invention provides in the circuit an automatic circuit breaker 217, preferably of the conventional micro-switch type, which is normally closed and opened by rod 173 whenever work is jammed at the loading station A, as hereinbefore described. Wiring 362' and 363' is omitted when the one-motor instead of the two-motor drive is employed.

OPERATION

Briefly, operation of the machine of the present invention is as follows:

Switch 366 is closed to operate any of the several drives hereinbefore described in detail, whereupon belts 345 operate a predetermined number of work holders 46 in the carrier head 67. In the present instance three of the work holders are operated at the machining stations B, C and D while two of the work holders in the carrier head are maintained clear of the belts 345 and are not rotated in the loading station A and unloading station E. However, as the work holders 46 move from stations A and E into the machining stations B, C and D they successively move into the field of belts 345 and are rotated thereby while the holders which successively move from stations B, C and D into stations E and A move from engagement with belts 345 and are no longer rotated thereby while in said stations E and A.

Concurrently main shaft 78 is rotated, by any of the several driving mechanisms hereinbefore described, whereupon indexing mechanism 85 and locking mechanism 86 through the shaft 28 move the carrier head 67 and the work holders 46 therein successively in a step-by-step manner to the loading station A, machining stations B, C and D, and to the unloading station E.

During the aforesaid operations main shaft 78 and intermediate shaft 92, in properly timed relation with the indexing mechanism 85, operate the selecting mechanism 137, feeding mechanism 138, locating mechanism 139, ejector rod 230 and the several machining mechanisms 237, 238 and 239. In this latter connection, and in an interrelated and coordinated manner, cam 131 and spring 132 oscillate lever 126 to operate the work-holder-conditioning means 70 at the loading and unloading stations A and E while cam 210 and spring 211 oscillate lever 203 about stud 204 to concurrently move locator and ejector rods 197 and 230 into engagement with work 47 at the loading and unloading stations A and E respectively. The ejector rod 230 serves to eject work from the work holder 46 into the unloading tube 236, while the locator rod 197 cooperates with a feeding and gauging ram 167 to properly locate work 47 in the work holder 46 while the work holder is open and until it is closed.

On the same main shaft 78 as the cam 210 is drum cam 193 which (concurrently with the cam 210) oscillates the lever 185 to reciprocate the feeding and gauging ram 167 toward and from the work holders 46 at the loading station A. Since the ram 167 has a normally close and controlled position with respect to head 184 by stop screw 194 engaging finger 189, successive pieces of work are moved from channel 145 in housing 144 exactly the same extent into successive work holders at the loading station A (locator plunger 195 and locator rod 197 cooperate in this connection). Operation of the feeding and gauging ram 167 is timed with respect to the cam 210 so that it pushes work into a work holder at station A only after the work holder is opened, and maintains it in proper relation to the work holder until cam 210 again closes the work holder.

As arm 185 is oscillated in clockwise direction, as viewed in Fig. 1, by drum cam 193 it moves a stud 367 on finger 189 into engagement with plunger 158 to operate the selecting mechanism 137 as by moving detent arm 147 in a counterclockwise direction whereupon primary detent 149 is released from the then lowermost piece of work in the inlet tube 139, as shown in Fig. 9, so that said work moves downwardly therein into engagement with secondary detent 150 which, because of the counterclockwise movement of the detent arm 147, is within the bore 139' of the inlet tube 139. When the finger 189 and stud 367 are moved to the left again from the dot-and-dash position adjacent to stop screw 194 toward the solid-line position coil spring 151 moves the detent arm 147 in a clockwise direction, whereupon first the primary detent 149 engages the head section 184 of work 47 immediately underlying it, and the one piece of work which until this time had been held by secondary detent 150 is released by the latter to fall downwardly into channel 145 or onto the top of ram 167 which is still in the channel 145 until such a time as the ram is fully retracted from the channel whereupon the single piece of work starts falling into the channel 145, as shown in Fig. 9, to be ready for the next movement of the ram 167 into the operative position.

After work holders 46 are unloaded at station E and again loaded at station A in the manner just described in detail, they are successively moved to station B where cam 267 and spring 270 operate machining mechanism 237 to cause tool bits 245 and 258 to end-trim and chamfer the nose of work 47; are then moved to station C where cam 294 and spring 270 operate rough-turning mechanism 238 to effect a rough-turn of the head 184 by circular cutter 282; and are next moved into station D where cam 335 and spring 341 operate finish-turning mechanism 239 so that tool bit 328 effects a finish-facing of the head 184 while tool bit 329 effects a qualifying or finish-turning of the channel and flange 140 of work 47. However, it should be particularly noted that the aforementioned operations are all effected in a practically simultaneous manner (all five stations are operative at practically the same time); viz.: work is being unloaded from one work holder while it is being loaded into another work holder; and, simultaneously or concurrently therewith, three different types of machining operations are being performed on three different pieces of work in three different work holders at stations B, C and D.

Variations and modifications may be made within the scope of this invention and portions of the improvements may be used without others.

Having thus described the invention what is claimed as new is:

1. In a machine of the character described, the combination of a frame; a plurality of work holders; a carrier for supporting all of said work holders and for moving the latter into loading and machining positions; a support for locating pieces of work axially relative to the work holders when the latter are in the loading position; loading means including a plunger for pushing work from the support to the work holder, a sleeve movable relative to said plunger, a yieldable means connecting said sleeve and plunger; means for reciprocating said sleeve; a driving mechanism for driving said carrier and sleeve reciprocating means; electrical control means for said driving mechanism, said control means being mounted on said sleeve; and means for operating said electrical control means for stopping said driving mechanism when there is relative movement between said sleeve and plunger.

2. In a machine of the character described, the combination of a frame; a plurality of rotatable and expansible work holding chucks open at both ends; an indexable rotating carrier for supporting said chucks; a loading station for said carrier; operating means at said loading station for opening and closing a chuck at said station; a feed plunger carried by said frame at said loading station on one side of said chucks and reciprocable axially thereof; a single reciprocable locating plunger supported by said frame on the other side of said chucks and operable axially relative to and toward said feed plunger to engage an article as it is loaded into a chuck by said feed plunger; means to advance said locating plunger to contact an article as it is loaded into said chuck and withdraw therefrom after the chuck has closed to grip said article; machining means; and means for operating said carrier, chuck opening and closing means, feed plunger, and locating plunger, in timed relation.

3. In a machine of the character described the combination of a frame; a plurality of rotatable and expansible work holding chucks open at both ends; an indexable rotating carrier for supporting said chucks; a loading station for said carrier; operating means at said loading station for opening and closing a chuck at said station; a feed plunger carried by said frame at said loading station on one side of said chucks and reciprocable axially thereof; a single reciprocable locating plunger supported by said frame on the other side of said chucks and operable axially relative to and toward said feed plunger to engage an article as it is loaded into a chuck by said feed plunger; means to advance said locating plunger to contact an article as it is loaded into said chuck and withdraw therefrom after the chuck has closed to grip said article; machining means; an ejection station for said carrier; operating means at said ejection station for opening and closing a chuck at said station; an ejection plunger; and means for operating said carrier, chuck opening and closing means, feed plunger, locating plunger, and ejection plunger in timed relation.

4. In a machine of the character described, the combination of a frame; a plurality of rotatable and expansible work holding chucks open at both ends; an indexable rotating carrier for supporting said chucks; a loading station for said carrier; operating means located at said loading station for opening and closing a chuck at said station; a feed plunger carried by said frame and reciprocable at one side of the carrier axially of said chucks at said loading station; a single reciprocable locating plunger supported by said frame on the other side of said carrier and operable axially relative to and into a chuck at the loading station so as to engage an article between said feed plunger and locating plunger; means to advance said locating plunger and thereafter withdraw the plunger from the chuck after the chuck has closed to grip an article; machining means; and means for operating said carrier, chuck opening and closing means, feed plunger, and locating plunger, in timed relation.

5. In a machine of the character described, the combination of a frame; a plurality of rotatable and expansible work holding chucks open at both ends; an indexable rotating carrier for supporting said chucks; a loading station for said carrier; means located at said loading station for opening and closing a chuck at said station; a feed plunger carried by said frame and reciprocable on one side of the carrier axially of a chuck at said loading station; means to feed cartridge cases in front of said plunger; a single reciprocable locating plunger supported by said frame on the other side of said carrier and operable axially relative to a chuck at the loading station to engage a cartridge case as it is loaded into said chuck by said feed plunger; means to advance said locating plunger and thereafter withdraw the plunger from the chuck after the chuck has closed to grip a cartridge case; tool means for operating on said case; and means for operating said carrier, chuck opening and closing means, feed plunger, and locating plunger, in timed relation.

6. In a machine of the character described, the combination of a frame; a plurality of rotatable and expansible work holding chucks open at both ends; an indexable rotating carrier for supporting said chucks; a loading station for said carrier; means located at said loading station for opening and closing a chuck at said station; a feed plunger carried by said frame and reciprocable at one side of said carrier axially of said chucks at said loading station; means to feed cuplike articles in front of said feed plunger with the closed base adjacent the feed plunger and open end toward the carrier; a single reciprocable locating plunger supported by said frame on the other side of said carrier and operable axially relative to and into a chuck located at the loading station and adapted to enter the open end of an article as it is fed into the chuck so as to engage the base of the article between the locating plunger and feed plunger; means to advance said locating plunger and thereafter withdraw the plunger from the article and chuck after the chuck has closed to grip an article; machining means; and means for operating said carrier, chuck opening and closing means, feed plunger, and locating plunger, in timed relation.

7. In a machine of the character described, the combination of a frame; a plurality of rotatable and expansible work holding chucks open at both ends; an indexable rotating carrier for supporting said chucks; a loading station for said carrier; an operating means located at said loading station for opening and closing a chuck at said station; a feed plunger carried by said frame and reciprocable at one side of the carrier axially of said chucks at said loading station; a single reciprocable locating plunger supported by said frame on the other side of said carrier, said plunger having a yieldable element on the end thereof, said plunger being operable axially relative to and into a chuck at the loading station so as to engage an article between said feed plunger and yieldable element of the locating plunger; operable means to advance said locating plunger and thereafter withdraw the same from the chuck after the chuck has closed to grip an article; machining means; and means for operating said carrier, chuck opening and closing means, feed plunger, and locating plunger, in timed relation.

8. In a machine of the character described, the combination of a frame; a plurality of rotatable and expansible work holding chucks open at both ends; an indexable rotating carrier for supporting said chucks; a loading station for said carrier; means located at said loading station for opening and closing a chuck at said station; a yieldable feed plunger carried by said frame and reciprocable at one side of said carrier axially of said chucks at said loading station; means to operate said feed plunger including a spring; means to feed cuplike articles in front of said feed plunger with the closed base adjacent said feed plunger and open end toward the carrier; a single reciprocable locating plunger having a spring pressed element in the end thereof, said plunger being supported by said frame on the other side of said carrier and operable axially relative to and into a chuck located at the loading station, and adapted to enter the open end of an article after it is fed into the chuck so as to engage the base of the article between the locating plunger yieldable element and the feed plunger, the feed plunger spring being stronger than the locating plunger yieldable element spring; means to advance said locating plunger and thereafter withdraw the same from the article and chuck after the chuck has closed to grip an article; machining means; and means for operating said carrier, chuck opening and closing means, feed plunger, and locating plunger, in timed relation.

9. In a machine of the character described, the combination of a frame; a plurality of rotatable work holding chucks open at both ends; an indexable dial wholly supported on said frame in exterior spaced relation thereto, said support being adjacent to one side of said dial, said dial supporting said chucks; a loading station for said carrier; operating means at said loading station for opening and closing a chuck at said station; a feed plunger at said loading station on one side of said chuck and reciprocable axially thereof; a reciprocable locating plunger supported on said frame on the other side of said chuck and operable axially relative to and toward said feed plunger to engage an article as it is loaded into a chuck by said feed plunger; means to advance and thereafter withdraw said locating plunger from an article in said chuck after the chuck has closed to grip an article; a plurality of tool holders carried by said frame, one of said tool holders being positioned between said frame and dial and adapted to support a tool in cooperative relation with the face of said dial adjacent said frame to operate on an end of an article projecting from a chuck, and another of said tool holders being adapted to support a tool in cooperative relation with the face of said dial remote from said frame; and means for operating said tools, carrier, chuck opening and closing means, feed plunger, and locating plunger, in timed relation.

10. In a cartridge case head turning machine, the combination of a frame; a plurality of rotatable and expansible work holding chucks open at both ends; an indexable rotating carrier for supporting said chucks; a loading station for said carrier; operating means at said loading station for opening and closing a chuck at said station; a feed plunger at said loading station on one side of said chucks and reciprocable axially thereof for feeding cartridge cases into a chuck, the open end of the case being fed toward and into the chuck; a single reciprocable locating plunger on the other side of said chucks operable axially relative to and toward said feed plunger to enter and engage the inside of the base of a cartridge case as it is loaded into a chuck by said feed plunger, said locating plunger yielding as the feed plunger completes its movement, the head of the case remaining exteriorly of the chuck; means to advance and thereafter withdraw said locating plunger from the case and chuck after the chuck has gripped an article; tool means for turning the head and grooves of the cartridge case; and means for operating said carrier, chuck opening and closing means, feed plunger, locating plunger, and head turning tool, in timed relation.

11. In a cartridge case head turning machine, the combination of a frame; a plurality of rotatable and expansible work holding chucks open at both ends; an indexable rotating carrier for supporting said chucks; a loading station for said carrier; operating means at said loading station for opening and closing a chuck at said station; a feed plunger at said loading station on one side of said chucks and reciprocable axially thereof for feeding cartridge cases into a chuck; a single reciprocable locating plunger on the other side of said chuck operable axially relative to and toward said feed plunger to engage one side of the base of said cartridge case as it is loaded into a chuck by said feed plunger, said locating plunger yielding as the feed plunger completes its movement, the head of the case being located exteriorly of the chuck; means to advance and thereafter withdraw said locating plunger from the case and chuck after the chuck has gripped the case; tool means for turning the head and grooves of the cartridge case; and means for operating said carrier, chuck opening and closing means, feed plunger, locating plunger, and head turning tool, in timed relation.

12. In a cartridge case head and mouth turning machine, the combination of a frame; a plurality of rotatable work holding chucks open at both ends; an indexable dial wholly supported on said frame in exterior spaced relation thereto, said support being adjacent to one side of said dial and said dial supporting said chucks; a loading station for said carrier; operating means at said loading station for opening and closing a chuck at said station; a feed plunger at said loading station on one side of said chucks and reciprocable axially thereof for feeding cartridge cases into a chuck, the open end of the case being fed toward and into the chuck so as to protrude from the far side of the dial; a reciprocable locating plunger on the other side of said chuck operable axially relative to and toward said feed plunger to enter and engage the inside of the base of a cartridge case as it is loaded into a chuck by said feed plunger, said locating plunger yielding as the feed plunger completes its movement, the head of the case remaining exteriorly of the chuck; means to advance and thereafter withdraw said locating plunger from the case and chuck after the chuck has gripped a case; a tool holder carried by said frame positioned between the frame and dial to support a tool in cooperative relation with the face of the dial to operate on the open end of the cartridge case projecting from the chuck, another tool holder being located adjacent the outside face of the dial for turning the head and groove of the base end of the cartridge case; and means for operating said carrier, chuck opening and closing means, feed plunger, locating plunger, and tools, in timed relation.

13. In a machine of the character described, the combination of a frame; an indexable rotating dial; a plurality of rotatable and expansible work holding chucks carried by said dial and open at both ends, said chucks including an expansible collet longitudinally held in fixed relation to said dial; a loading station for said carrier; operating means at said loading station for opening and closing a collet at said station; a feed plunger carried by said frame at said loading station on one side of said chucks and reciprocable axially thereof; a single reciprocable locating plunger supported by said frame on the other side of said chucks and operable axially relative to and toward said feed plunger to engage an article as it is loaded into a chuck by said feed plunger; means to advance said locating plunger to contact an article as it is loaded into said chuck and withdraw therefrom after the chuck has closed to grip said article; machining means; and means for operating said carrier, chuck opening and closing means, feed plunger, and locating plunger, in timed relation.

14. In a machine of the character described, the combination of a frame; an indexable rotating dial; a plurality of rotatable work holding chucks, each of said chucks including a pulley, an inner sleeve connected to said pulley, means for rotatably supporting said sleeve and pulley in fixed longitudinal axial relationship to said carrier, a normally expanded collet within said inner sleeve and having an external taper, means to maintain said collet in fixed axial relationship to said carrier, a reciprocable operator between said sleeve and collet having an internal taper, means normally urging said operator and its internal taper into engagement with said internal taper of the collet to close the latter; a loading station for said dial; operating means at said loading station for moving said reciprocable operator for opening or closing a collet at said station; a feed plunger carried by said frame at said loading station on one side of said chucks and reciprocable axially thereof; a single reciprocable locating plunger supported by said frame on the other side of said chucks and reciprocable axially relative to and toward said feed plunger to engage an article as it is loaded into a chuck by said feed plunger; means to advance said locating plunger to contact an article as it is loaded into said chuck and withdraw therefrom after the chuck has closed to grip said article; machining means; and means for operating said carrier, chuck opening and closing means, feed plunger, and locating plunger, in timed relation.

15. In a machine of the character described, the combination of a carrier, a pulley; an inner sleeve connected to said pulley; means for rotatably supporting said sleeve and pulley in fixed longitudinal axial relationship to said carrier; a normally expanded collet open at both ends within said inner sleeve and having an external taper; means to maintain said collet in fixed axial relationship to said carrier; a reciprocable operator between said sleeve and collet having an internal taper; means normally urging said operator into engagement with said external taper of the collet to close the latter; and means to reciprocate said operator.

16. In an automatic machine having a frame; a plurality of work holders; a dial supporting said work holders and indexable to a plurality of operating stations; means to feed tubular work to said dial; means for rotating said work holders; and a tool operating means at one of said stations, said tool means comprising a transversely movable tool holder for trimming an end of said tubular piece of work in a work holder at said station and a second tool holder at said station pivotally mounted and operable by said transverse tool holder after it has completed its trimming operation to further shape the trimmed end of said piece of work.

WARREN S. REYNOLDS.